US010142939B2

(12) United States Patent
Ohwatari et al.

(10) Patent No.: US 10,142,939 B2
(45) Date of Patent: Nov. 27, 2018

(54) BASE STATION AND USER DEVICE FOR REDUCING AMOUNT OF INFORMATION FOR INTERFERENCE CANCELLER IN RADIO COMMUNICATION SYSTEM

(71) Applicant: NTT DOCOMO, INC., Tokyo (JP)

(72) Inventors: Yusuke Ohwatari, Tokyo (JP); Kazuaki Takeda, Tokyo (JP); Yousuke Sano, Tokyo (JP); Yukihiko Okumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/326,593

(22) PCT Filed: Jul. 14, 2015

(86) PCT No.: PCT/JP2015/070207
§ 371 (c)(1),
(2) Date: Jan. 16, 2017

(87) PCT Pub. No.: WO2016/013456
PCT Pub. Date: Jan. 28, 2016

(65) Prior Publication Data
US 2017/0208552 A1   Jul. 20, 2017

(30) Foreign Application Priority Data

Jul. 22, 2014 (JP) ................................. 2014-148468

(51) Int. Cl.
*H04W 72/04* (2009.01)
*H04W 52/14* (2009.01)

(52) U.S. Cl.
CPC ...... *H04W 52/143* (2013.01); *H04W 72/0466* (2013.01); *H04W 72/0473* (2013.01)

(58) Field of Classification Search
CPC . H04W 52/143; H04W 52/00; H04W 72/042; H04W 72/0466; H04W 72/0473; H04W 40/24
(Continued)

(56) References Cited

U.S. PATENT DOCUMENTS

| 2013/0005269 A1* | 1/2013 | Lindoff | H04J 11/0026 |
| | | | 455/63.1 |
| 2014/0044091 A1* | 2/2014 | Kishiyama | H04L 5/0014 |
| | | | 370/330 |

FOREIGN PATENT DOCUMENTS

| EP | 2712106 A1 | 3/2014 |
| JP | 2012/503346 A | 2/2012 |

(Continued)

OTHER PUBLICATIONS

Extended European Search Report issued in the counterpart European Patent Application No. 15825437.5, dated Jun. 19, 2017 (10 pages).
(Continued)

*Primary Examiner* — Philip Sobutka
(74) *Attorney, Agent, or Firm* — Osha Liang LLP

(57) ABSTRACT

A base station, according to received qualities at user devices, allocates a downlink transmission power to each user device. The base station transmits a mixed data signal in which data signals mutually not orthogonal and each addressed to a corresponding user device are mixed. Control signals are transmitted to user devices to enable each user device to decode a data signal addressed to the user device using a control signal corresponding to the user device. Each control signal is scrambled by the identifier of the corresponding user device. A control signal for a first user device to which a first data signal is addressed includes information indicating the identifier of a second user device to which a second data signal mixed with the first data signal is
(Continued)

addressed. The first user device is thus enabled to descramble a control signal for the second user device.

10 Claims, 11 Drawing Sheets

(58) Field of Classification Search
USPC .......................................................... 455/522
See application file for complete search history.

(56) References Cited

FOREIGN PATENT DOCUMENTS

| JP | 2013/009290 A | 1/2013 |
| JP | 2013/058945 A | 3/2013 |
| JP | 2013/179593 A | 9/2013 |
| WO | 2010/005640 A2 | 1/2010 |
| WO | 2013/007491 A1 | 1/2013 |
| WO | 2014/089079 A1 | 6/2014 |

OTHER PUBLICATIONS

International Search Report issued for PCT/JP2015/070207 dated Sep. 1, 2015 (2 pages).

3GPP TR 36.866 V12.0.1; "3rd Generation Partnership Project; Technical Specification Group Radio Access Network; Study on Network-Assisted Interference Cancellation and Suppression (NAIC) for LTE (Release 12)"; Mar. 2014 (64 pages).

Manchon, C.N. et al.; "On the Design of a MIMO-SIC Receiver for LTE Downlink"; Vehicular Technology Conference, Sep. 21-24, 2008. VTC 2008-Fall. IEEE 68th (8 pages).

3GPP TS 36.212 V11.4.0; "3rd Generation Partnership Project; Technical Specification Group Radio Access Network; Evolved Universal Terrestrial Radio Access (E-UTRA); Multiplexing and channel coding (Release 11)"; Dec. 2013 (84 pages).

* cited by examiner

FIG. 5    RELATED ART

| INFORMATION ELEMENT | CWIC | SLIC | ML | REMARK |
|---|---|---|---|---|
| Carrier indicator | not required | not required | not required | |
| Resource allocation header | see remark | see remark | see remark | Basically required, but not required when the same resource as that for UE in which canceller is provided is allocated to interfering UE. |
| Resource block assignment | see remark | see remark | see remark | |
| Downlink Assignment Index | not required | not required | not required | |
| TPC command for PUCCH | not required | not required | not required | |
| HARQ process number | not required | not required | not required | |
| Scrambling identity, rank indicater, DM-RS port | required | required | required | |
| SRS request | not required | not required | not required | |
| Modulation and coding scheme | required | see remark | see remark | Modulation information only is required. |
| New data indicator | required | not required | not required | |
| Redundancy version | required | not required | not required | |
| HARQ-ACK resource offset | not required | not required | not required | |
| PDSCH RE Mapping and Quasi-Co-Location Indicator | not required | not required | not required | |
| Localized/Distributed VRB assignment flag | see remark | see remark | see remark | Basically required, but not required when the same resource as that for UE in which canceller is provided is allocated to interfering UE. |
| Transport block to codeword swap flag | required | required | required | |
| Precoding information | required | required | required | |

FIG. 10

| INDEX | RNTI |
|---|---|
| 00 | 0123 |
| 01 | f1ab |
| 10 | ffff |
| 11 | 85bd |

RELATED ART

CCE INDEX | 0 | 1 | 2 | 3 | 4 | 5 | 6 | 7 | 8 | 9 | 10 | 11 | 12 | 13 | 14 | 15 | 16 | 17 | ···

AGGREGATION LEVEL 1

AGGREGATION LEVEL 2

AGGREGATION LEVEL 4

AGGREGATION LEVEL 8

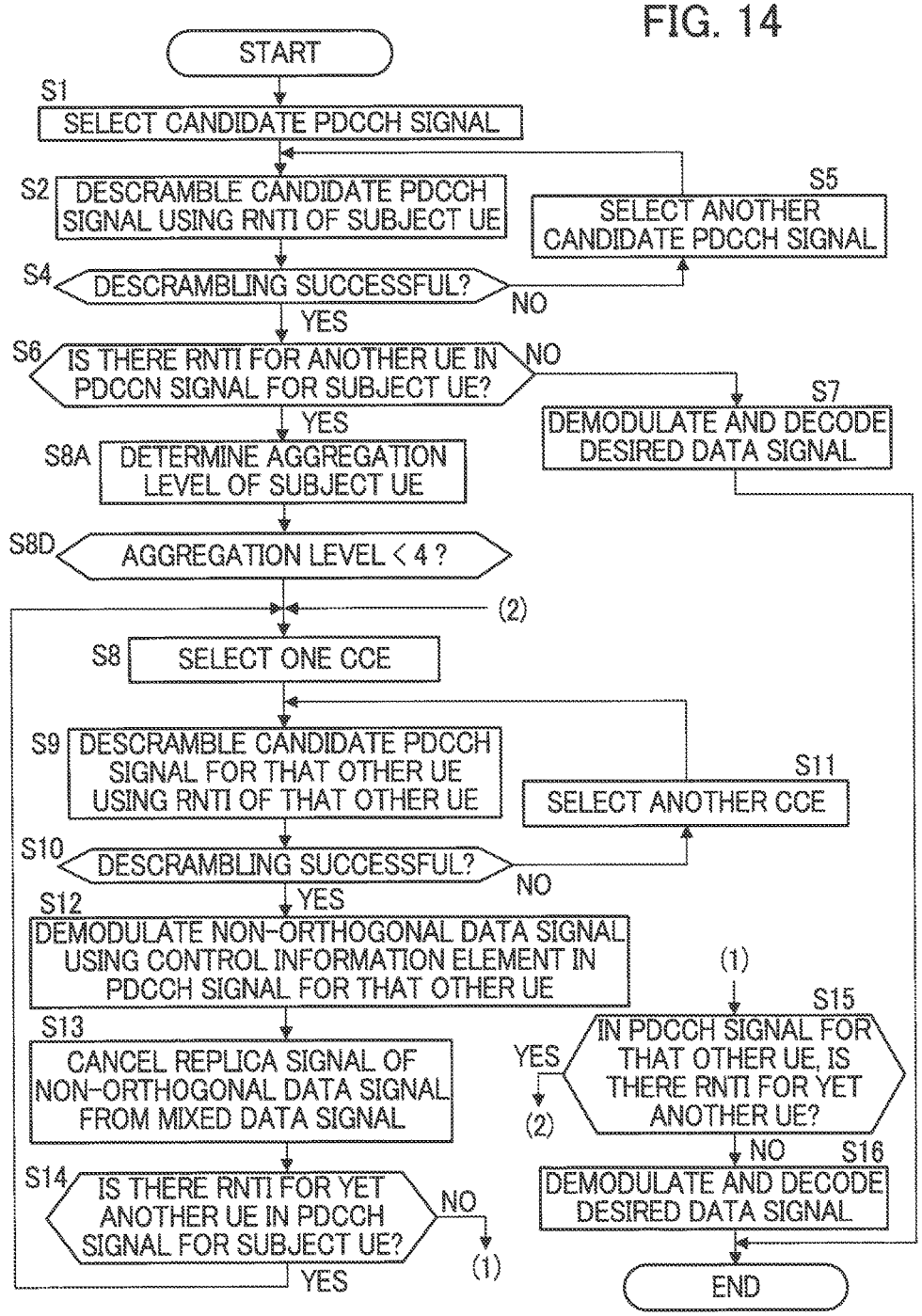

BASE STATION AND USER DEVICE FOR REDUCING AMOUNT OF INFORMATION FOR INTERFERENCE CANCELLER IN RADIO COMMUNICATION SYSTEM

TECHNICAL FIELD

The present invention relates to a base station and to a user device.

BACKGROUND ART

In a mobile communication network, orthogonal multiple access in which signals do not interfere with each other is widely used for communication between a base station and a user device (e.g., a mobile station). In orthogonal multiple access, different radio resources are allocated to different user devices. Examples of orthogonal multiple access include code division multiple access (CDMA), time division multiple access (TDMA), and orthogonal frequency division multiple access (OFDMA). For example, Long Term Evolution (LTE) standardized by the 3GPP uses OFDMA for downlink communication. In OFDMA, different frequencies are allocated to different user devices.

In recent years, non-orthogonal multiple access (NOMA) has been proposed as a communication scheme between a base station and a user device (e.g., see Patent Document 1). In non-orthogonal multiple access, the same radio resource is allocated to different user devices. More specifically, a single frequency is allocated to different user devices simultaneously. When non-orthogonal multiple access is applied to downlink communication, a base station transmits signals with a high transmission power to a user device having a large path loss, i.e., a user device with a small received SINR (signal-to interference plus noise power ratio) (generally, a user device located at an edge of a cell area), and a base station transmits signals with a low transmission power to a user device having a small path loss, i.e., a user device with a large received SINR (generally, a user device centrally located in a cell area). Therefore, there may be interference between signals received by each user device and signals addressed to other user devices.

In this case, each user device demodulates signals addressed to the user device using power differences. More specifically, each user device first demodulates a signal having the highest received power. Since the demodulated signal is a signal addressed to the user device located closest to an edge of a cell area (more accurately, the user device having the lowest received SINR), the user device located closest to an edge of the cell area (the user device having the lowest received SINR) ends demodulation. Each of the other user devices cancels from the received signal an interference component that is equivalent to the demodulated signal using an interference canceller and demodulates a signal having the second highest received power. Since the demodulated signal is a signal addressed to a user device located second closest to an edge of the cell area (more accurately, the user device having the second lowest received SINR), the user device located second closest to an edge of the cell area (the user device having the second lowest received SINR) ends demodulation. By repeating the demodulation and the cancellation of a signal having a high power in this manner, every user device is able to demodulate a signal addressed to the user device.

By combining non-orthogonal multiple access with orthogonal multiple access, it is possible to increase the capacity of a mobile communication network, compared with when orthogonal multiple access alone is used. In other words, when orthogonal multiple access alone is used, it is not possible to allocate a certain radio resource (e.g., a frequency) simultaneously to multiple user devices. However, when non-orthogonal multiple access is combined with orthogonal multiple access, it is possible to allocate a certain radio resource simultaneously to multiple user devices.

Representative candidates for an interference canceller used in NOMA include the following three interference cancellers (Non-Patent Document 1).

Symbol-Level Interference Canceller (SLIC)

This interference canceller handles interference signals at the symbol level (that is, for each resource element (RE)) and cancels demodulation results of the interference signals.

Codeword-Level IC (CWIC)

This interference canceller is also referred to as a Turbo SIC (successive interference canceller) or a Codeword SIC, and decodes interference signals at the codeword level and cancels decoding results. A Codeword SIC is described for example in Non-Patent Document 2.

Maximum Likelihood (ML)

This interference canceller performs joint estimation of a desired signal and an interference signal at the symbol level (that is, for each resource element (RE)).

In order to improve performance in NOMA, it is desirable that a receiver have a high-accuracy interference canceller. Application of CWIC is therefore desirable. However, in order to improve the accuracy of an interference canceller, an increased amount of information on interference signals will be required. Since a CWIC cancels results of decoding interference signals, a CWIC will require more types of information elements of interference signals than other interference cancellers will. Information required for a CWIC is described in Section 7.5 of Non-Patent Document 1. Since other interference cancellers cancel results of demodulating interference signals, these other interference cancellers will also require various information to demodulate interference signals.

Here, interference signals are data signals that interfere with a desired data signal for a user device and are addressed to other user devices. In LTE, to demodulate or decode a data signal, information will be required that is included in a control signal corresponding to a user device to which the data signal is addressed. Accordingly, an interference canceller needs to decrypt control signals corresponding to other user devices.

Patent Document 1 describes various methods for allowing a mobile station to recognize control information for other mobile stations in a radio communication system using non-orthogonal multiple access.

RELATED ART DOCUMENTS

Patent Document

Patent Document 1: Japanese Patent Application Laid-Open Publication No. 2013-009290

Non-Patent Documents

Non-Patent Document 1: 3GPP TR 36.866 V12.0.1 (2014 March), 3rd Generation Partnership Project; Technical Specification Group Radio Access Network; Study on Network-Assisted Interference Cancellation and Suppression (NAIC) for LIE (Release 12), March 2014.

Non-Patent Document 2: Manchon, C. N., et al, "On the Design of a MIMO-SIC Receiver for LTE Downlink", Vehicular Technology Conference, 2008. VTC 2008-Fall. IEEE 68th

SUMMARY OF THE INVENTION

Problem to be Solved by the Invention

FIG. 8(b) of Patent Document 1 discloses that in a control signal addressed to a user, in addition to control information for the user, control information that is addressed to another user is also multiplexed. However, since the amount of information that can be transmitted with a control signal for a user is limited, it is sometimes difficult to transmit control information that contains a large amount of information and is addressed to another user. Moreover, it will decrease communication efficiency if, every time a control signal for a user is transmitted, control information is transmitted that contains a large amount of information and is addressed to another user.

FIG. 9 of Patent Document 1 discloses that a control signal addressed to a user includes information for demodulating a control signal for another user. A specific example of the information for demodulating a control signal for another user includes a UE ID and information (e.g., a control channel element (CCE) index or the like) indicating the position of a radio resource block. However, since the amount of information that can be transmitted with a control signal for a user is limited, it may be sometimes difficult to transmit information indicating the position of a radio resource block for demodulating a control signal for another user. Moreover, it will decrease communication efficiency if, every time a control signal for a user is transmitted, information indicating a position of a radio resource block for another user is transmitted.

In view of this, the present invention provides a base station and a user device that reduce an increase in the amount of information for an interference canceller transmitted with control signals in a radio communication system using non-orthogonal multiple access.

Means of Solving the Problems

A base station according to a first aspect of the present invention includes: a downlink transmission power decider configured to allocate, according to received qualities at user devices and to each of the user devices, one of different downlink transmission powers for downlink data transmission; and a radio transmitter configured to transmit a mixed data signal in which data signals that are not orthogonal to each other are mixed, each of the data signals being addressed to a corresponding one of the user devices, such that each data signal is transmitted with a corresponding one of the downlink transmission powers decided by the downlink transmission power decider, and to transmit control signals to the user devices to enable each user device to decode the data signal addressed to the user device using a control signal, among the control signals, corresponding to the user device. The radio transmitter transmits each control signal in a format in which the control signal is scrambled by an identifier of the user device corresponding to the control signal. In order to enable a first user device, to which a first data signal is addressed, to descramble a control signal for at least one second user device, to which at least one second data signal is addressed, the radio transmitter includes, in a control signal for the first user device, information indicating an identifier of the at least one second user device, the first user device and the at least one second user device being among the user devices, the first data signal having a downlink transmission power that is not the highest among the downlink transmission powers decided by the downlink transmission power decider, the second data signal being mixed in the mixed data signal together with the first data signal. The radio transmitter does not transmit to the first user device information indicating a radio resource for transmitting the control signal for the at least one second user device.

A base station according to a second aspect of the present invention includes: a downlink transmission power decider configured to decide, according to received qualities at user devices, different downlink transmission powers for transmitting downlink data to the user devices; and a radio transmitter configured to transmit a mixed data signal in which data signals that are not orthogonal to each other are mixed, each of the data signals being addressed to a corresponding one of the user devices, such that each data signal is transmitted with a corresponding one of the downlink transmission powers decided by the downlink transmission power decider, and to transmit control signals to the user devices to enable each user device to decode the data signal addressed to the user device using a control signal, among the control signals, corresponding to the user device. The radio transmitter transmits each control signal in a format in which the control signal is scrambled by an identifier of the user device corresponding to the control signal. The radio transmitter, at a cycle longer than a transmission cycle of the control signals, notifies the user devices of a list in which identifiers of the user devices, to which the data signals that are not orthogonal to each other are addressed, are associated in a one-to-one correspondence with indices that each have a shorter length than the identifiers each do. In order to enable a first user device, to which a first data signal is addressed, to descramble a control signal for at least one second user device, to which at least one second data signal is addressed, the radio transmitter includes, in a control signal for the first user device, an index that corresponds to the at least one second user device, the first user device and the at least one second user device being among the user devices, the first data signal having a downlink transmission power that is not the highest among the downlink transmission powers decided by the downlink transmission power decider, the second data signal being mixed in the mixed data signal together with the first data signal.

A user device according to the present invention includes: a radio receiver configured to receive, from a base station, a mixed data signal that includes data signals that are not orthogonal to each other, have different powers, and are each addressed to a corresponding one of user devices, and to receive control signals corresponding to the user devices; a first descrambler configured to descramble a control signal that is among the control signals and corresponds to the user device using an identifier of the user device; a recognizer configured to recognize, from information included in the control signal that corresponds to the user device and is descrambled by the first descrambler, an identifier of at least one other user device, to which at least one non-orthogonal signal is addressed, the at least one non-orthogonal signal being mixed in the mixed data signal together with a desired data signal addressed to the user device; a second descrambler configured to descramble a control signal that is among the control signals and corresponds to the at least one other user device using the identifier of the at least one other user device recognized by the recognizer; a non-orthogonal signal demodulator configured to demodulate the at least one non-orthogonal data signal using the control signal corresponding to the at least one other user device and descrambled by the second descrambler; a non-orthogonal signal canceller configured to cancel, from the mixed data signal, a replica signal that is equivalent to the at least one non-orthogonal data signal demodulated by the non-orthogonal signal demodulator; and a desired data signal decoder configured to decode the desired data signal from a signal output from the non-orthogonal signal canceller using the control signal corresponding to the user device descrambled by the first descrambler. The second descrambler attempts descrambling one control signal among the control signals corresponding to the user devices that include the at least one other user device using the identifier of the at least one other user device. In a case in which the second descrambler fails in descrambling the one control signal, the second descrambler attempts descrambling another control signal among the control signals. In a case in which the second descrambler succeeds in descrambling the one control signal, the non-orthogonal signal demodulator demodulates the at least one non-orthogonal data signal using a control signal output from the second descrambler, and the non-orthogonal signal canceller cancels from the mixed data signal the replica signal that is equivalent to the at least one non-orthogonal data signal.

Effect of the Invention

According to the base station of the first aspect of the present invention, a control signal for a first user device to which a first data signal is addressed includes information indicating the identifier of at least one second user device to which at least one second data signal is addressed, the first data signal having a downlink transmission power that is not the highest, the second data signal being mixed in a mixed data signal together with the first data signal. As a result, the first user device is able to descramble a control signal for the second user device using the identifier of the at least one second user device to demodulate the at least one second data signal, and cancel a replica signal that is equivalent to the at least one second data signal from the mixed data signal. Since information indicating a radio resource for transmitting the control signal for the at least one second user device is not transmitted to the first user device, it is possible to reduce an increase in the amount of information that is transmitted with a control signal for the interference canceller. In this way, it is possible to reduce an increase in traffic amount.

According to the base station of the second aspect of the present invention, at a cycle longer than the transmission cycle of the control signals, a list is notified to user devices in which list the identifiers of the user devices, to which data signals that are not orthogonal to each other are addressed, and indices are associated in a one-to-one correspondence. A control signal for a first user device includes an index corresponding to at least one second user device. The first user device is able to identify the identifier of the at least one second user device from the list and from the index corresponding to the at least one second user device. The first user device is then able to descramble a control signal for the at least one second user device using the identifier of this second user device to demodulate a second data signal, and cancel a replica signal that is equivalent to the second data signal from a mixed data signal. Since the index included in the control signal for the first user device has a shorter length than the identifier does, it is possible to reduce an increase in the amount of information that is transmitted with a control signal for an interference canceller. In this way, it is possible to reduce an increase in traffic amount.

Furthermore, in NOMA, there can be multiple groups of data signals having different transmission powers (there can be multiple groups of user devices). A base station of the present invention includes, in a control signal for a first user device to which a first data signal is addressed, an identifier of a second user device to which a second data signal is addressed, the first data signal having a downlink transmission power that is not the highest, the second data signal being mixed together with the first data signal in the mixed data signal. The base station thereby enables the first user device to descramble the control signal for the second user device. In other words, a base station notifies a user device, to which a low power among powers multiplexed by NOMA is allocated, of an identifier of another user device that belongs to the same group as the user device and to which user device a higher power than that for the user device is allocated. The user device is not notified of identifiers of user devices belonging to another group. Accordingly, in a case in which the user device attempts descrambling one control signal among control signals using the identifier of another user device and succeeds in descrambling, the descrambled control signal is a control signal for that other user device belonging to the same group as the user device and the descrambled control signal corresponds to a non-orthogonal data signal. As a result, in a case in which the user device succeeds in descrambling, the user device is able to demodulate the non-orthogonal data signal, and therefore, the processing load on the user device is reduced.

The user device according to the present invention recognizes, from information included in a control signal corresponding to the user device, an identifier of at least one other user device, and attempts descrambling one control signal among control signals using the identifier of the at least one other user device. In a case in which the user device succeeds in descrambling, the user device demodulates a non-orthogonal data signal and cancels a replica signal that is equivalent to the non-orthogonal data signal from a mixed data signal. In this manner, even when the user device does not know a radio resource that is used for transmitting a control signal for another user device, the user device is able to decrypt the control signal for that other user device by trial and error (blind decoding), demodulate a non-orthogonal data signal, and cancel a replica signal equivalent to the non-orthogonal data signal from a mixed data signal. Therefore, the user device contributes to reduce an increase in the amount of information that is transmitted with a control signal for an interference canceller.

Furthermore, in NOMA, there can be multiple groups of data signals having different transmission powers. The radio transmitter of a base station of the present invention includes, in a control signal for a first user device to which a first data signal is addressed, an identifier of a second user device to which a second data signal is addressed, the first data signal having a downlink transmission power that has been decided by the downlink transmission power decider and is not the highest, the second data signal being mixed together with the first data signal in the mixed data signal. The first user device is thereby enabled to descramble a control signal for the second user device. In other words, the radio transmitter notifies a user device, to which a low power among powers multiplexed by NOMA is allocated, of an identifier of another UE that belongs to the same group as the user device and to which UE a higher power than that for the user device is allocated. The user device is not notified of identifiers of user devices belonging to another group. The user device according to the present invention recognizes, from a control signal corresponding to the user device, an identifier of at least one other user device to which a non-orthogonal data signal is addressed, the non-orthogonal data signal being mixed in a mixed data signal together with a desired data signal addressed to the user device. That is, the user device recognizes an identifier of another user device that belongs to the same group as the user device. Accordingly, in a case in which the user device attempts descrambling one control signal among control signals using the identifier of another user device and succeeds in descrambling, the descrambled control signal is a control signal for that other user device belonging to the same group as the user device and the descrambled control signal corresponds to a non-orthogonal data signal. As a result, when the user device succeeds in descrambling, the user device is able to demodulate the non-orthogonal data signal, and therefore, the processing load on the user device is reduced.

BRIEF DESCRIPTION OF THE DRAWINGS

FIG. 5 is a table illustrating information elements of PDCCH required by representative candidate interference cancellers used in NOMA.

FIG. 10 is a table illustrating an example of a list used in a second embodiment of the present invention.

FIG. 11 is a diagram for describing aggregation levels used in LTE.

FIG. 14 is a flowchart illustrating processing executed by a user device according to a fourth embodiment of the present invention.

MODES FOR CARRYING OUT THE INVENTION

Hereinafter, various embodiments of the present invention will be described with reference to the accompanying drawings.

First, an overview of non-orthogonal multiple access (NOMA) will be described.

Figure 1:
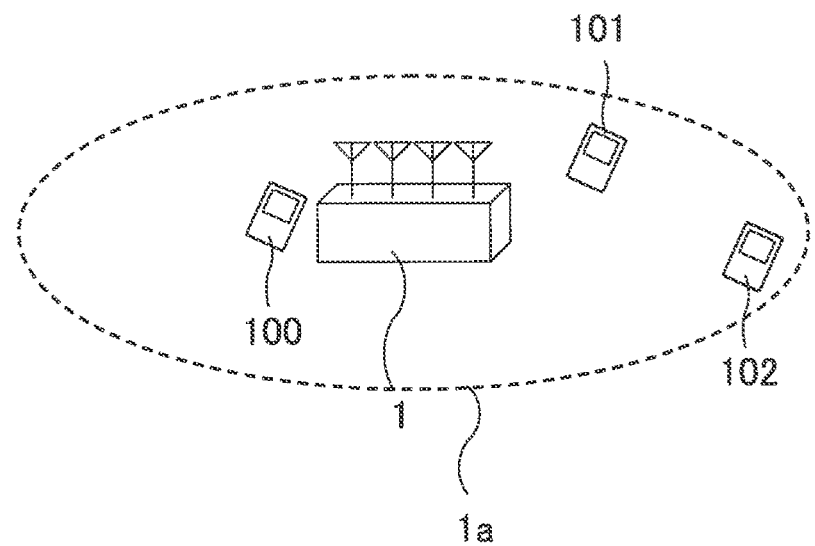
FIG. 1 is a schematic diagram illustrating a base station and a user device for describing an overview of non-orthogonal multiple access.

As illustrated in FIG. 1, a base station 1 communicates with user devices (user equipments,UEs) 100 to 102, In FIG. 1, reference sign 1a indicates a cell area of the base station 1. The UE 102 is located at an edge of a cell area, i.e., closest to the boundary of the cell area 1a, and is farthest from the base station 1 and has the greatest path loss (that is, having the smallest received SINR). The UE 100 is located close to the center of the cell area 1a, is closest to the base station 1, and has the smallest path loss (that is, having the greatest received SINR). The UE 101 is located closer to the base station 1 than the UE 102 is, and it is farther from the base station 1 than the UE 100 is.

Figure 2:
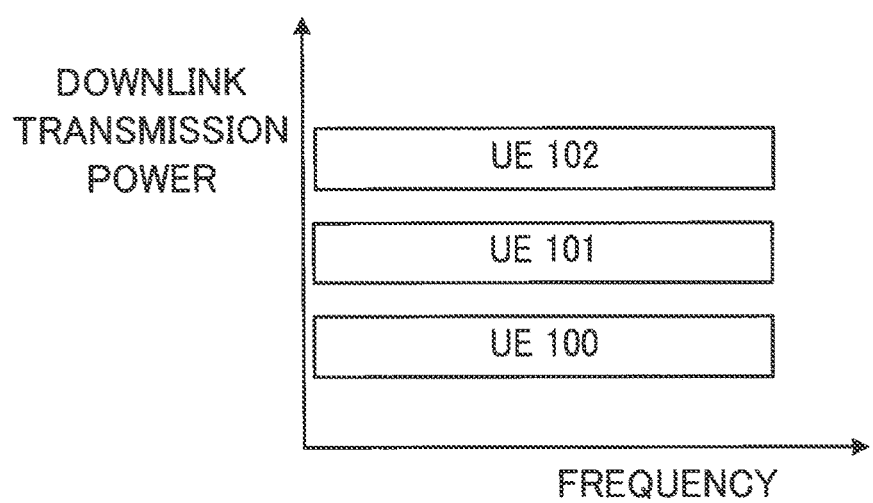
FIG. 2 is a diagram illustrating an example allocation of downlink transmission power to user devices by a base station in non-orthogonal multiple access.

FIG. 2 is a diagram illustrating an example allocation of downlink transmission power to UEs by a base station in NOMA. The base station 1 transmits downlink data to the UEs 100 to 102 using the same frequency simultaneously. That is, the same frequency and the same time are allocated to these UEs 100 to 102. The base station 1 uses the highest downlink transmission power for transmission to the UE 102, which is located the farthest from the base station 1, and uses the lowest downlink transmission power for transmission to the UE 100, which is located the closest to the base station 1.

UEs that are connected to the base station 1 are not limited to the UEs 100 to 102. NOMA can be combined with orthogonal multiple access, and a frequency different from the frequency allocated to the UEs 100 to 102 may be allocated to UEs other than the UEs 100 to 102. Moreover, the number of UEs to which the same frequency is allocated simultaneously (the number of UEs multiplexed in NOMA) is not limited to three, and may be two, four, or more.

From the standpoint of the UEs 100 to 102, a data signal having the highest received power is the data signal addressed to the UE 102, and a data signal having the lowest received power is the data signal addressed to the UE 100. Each of the UEs 100 to 102 first demodulates the data signal having the highest received power. Since the demodulated data signal is the data signal addressed to the UE 102 located close to the boundary of the cell area 1a, the UE 102 ends demodulation and uses the demodulated data signal. The other UEs 100 and 101 each cancel an interference component (a replica signal) that is equivalent to the demodulated data signal from the received signal using an interference canceller and demodulate a data signal having the second highest received power. Since the demodulated data signal is the data signal addressed to the UE 101 located the second closest to the boundary of the cell area 1a, the UE 101 ends demodulation and uses the demodulated data signal. By repeating the demodulation and cancellation of data signals having high received powers in this manner as necessary, every one of the UEs 100 to 102 is able to demodulate a data signal addressed to the UE. As described above, in NOMA, a UE cancels data signals (interference signals) that are addressed to other UEs and are transmitted from the serving base station 1 until the UE demodulates a data signal addressed to the UE.

In SLIC and ML mentioned above, an interference signal is demodulated and a replica signal of the demodulation result is cancelled from a received signal. In CWIC, an interference signal is decoded as well as demodulated, and a replica signal of the decoding result is canceled from a received signal. In the following description, demodulation of interference signals in SLIC and ML and a combination of demodulation and decoding of interference signals in CWIC will be referred to simply as "demodulation".

Figure 3:
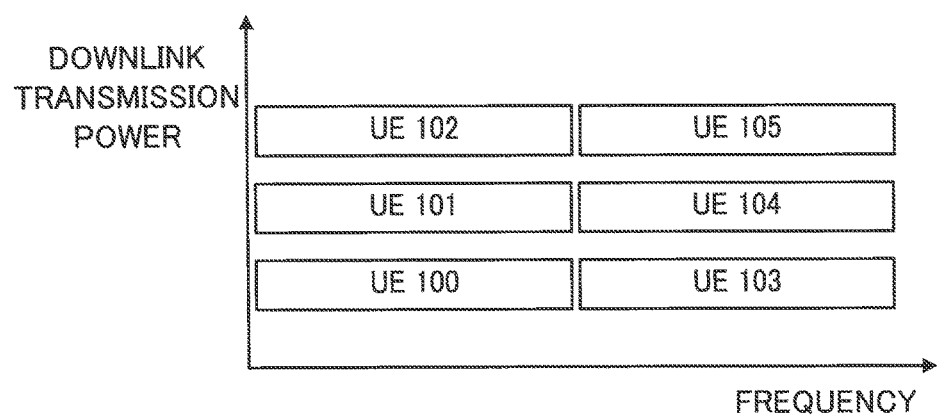
FIG. 3 is a diagram illustrating another example allocation of downlink transmission power to user devices by a base station in non-orthogonal multiple access.

FIG. 3 is a diagram illustrating another example allocation of downlink transmission power to user devices by a base station in NOMA. UEs 100 to 102 form a group of data devices that are allocated with different transmission powers, and UEs 103 to 105 form another group of data devices that are allocated with different transmission powers. A UE (e.g., the UE 103) having a low received power demodulates data signals that are addressed to other UEs (e.g., the UEs 104 and 105) belonging to the same group as the UE and having high received powers, and cancels replica signals of the demodulation results.

Figure 4:
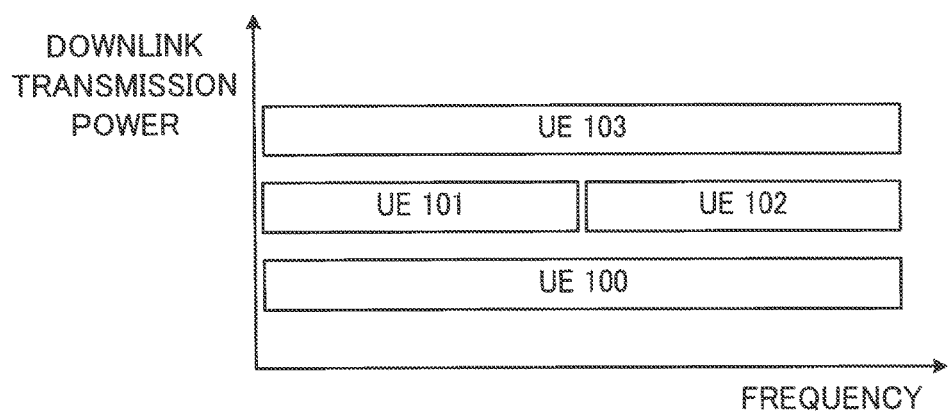
FIG. 4 is a diagram illustrating another example allocation of downlink transmission power to user devices by a base station in non-orthogonal multiple access.

FIG. 4 is a diagram illustrating another example allocation of downlink transmission power to user devices by a base station in NOMA. In this example, the highest transmission power is allocated to the UE 103, an intermediate transmission power is allocated to each of the UEs 101 and 102, and the lowest transmission power is allocated to the UE 100. Although the same transmission power is allocated to the UEs 101 and 102, the UEs 100, 101, and 103 form a group of data devices that are allocated with different transmission powers, and the UEs 100, 102, and 103 form another group of data devices that are allocated with different transmission powers. The UEs 101 and 102 each demodulate a data signal addressed to the UE 103 and cancel a replica signal of the demodulation result. The UE 100 demodulates data signals addressed to other UEs (that is, the UEs 101 to 103) belonging to at least one of the two groups to which the UE 100 belongs.

In LTE, demodulation or decoding of a data signal requires various information elements transmitted with a control signal (a PDCCH (physical dedicated control channel) signal) corresponding to a UE to which the data signal is addressed. An interference canceller thus needs to decrypt PDCCH signals corresponding to other UEs. Information elements transmitted with a PDCCH are described in Section 5.3.3.1 of 3GPP TS 36.212 V 11.4.0 and will differ depending on a DCI (downlink control information) format.

FIG. 5 illustrates information elements of PDCCH required by representative candidate interference cancellers used in NOMA. In particular, CWIC requires more information elements than SLIC or ML does. A UE in which an interference canceller is provided needs to know these various information elements for other UEs that are interference sources. It may be envisaged that a PDCCH signal addressed to a UE that is to cancel interference will include these control information elements addressed to other UEs. However, since the amount of information that can be transmitted with a PDCCH signal for each UE is limited, it may be sometimes difficult to transmit these control information elements addressed to other UEs. Moreover, transmitting these information elements from a base station to a UE that is to cancel interference will lead to an increase in traffic amount and will decrease communication efficiency.

First Embodiment

In view of circumstances described above, a base station according to a first embodiment of the present invention includes, in a PDCCH signal addressed to a UE that is to cancel interference, a C-RNTI (cell-radio network temporary ID) of another UE to which a data signal to be cancelled is addressed. In the following description, a C-RNTI will be referred to simply as an RNTI for brevity. In LTE, a PDCCH signal is transmitted in a format in which the PDCCH signal is scrambled by the RNTI of a UE to which the PDCCH signal is addressed. Each UE can descramble a PDCCH addressed to the UE using the RNTI of the UE. A PDCCH signal includes a CRC (cyclic redundancy check) bit scrambled by an RNTI. If an RNTI obtained by a UE descrambling a PDCCH signal matches the RNTI of the UE, the PDCCH signal is a PDCCH signal for the UE. Using the same principle, if a UE knows the RNTI of another UE, it is possible for the UE to descramble a PDCCH signal for that other UE to decrypt control information elements included in the PDCCH signal.

Figure 6:
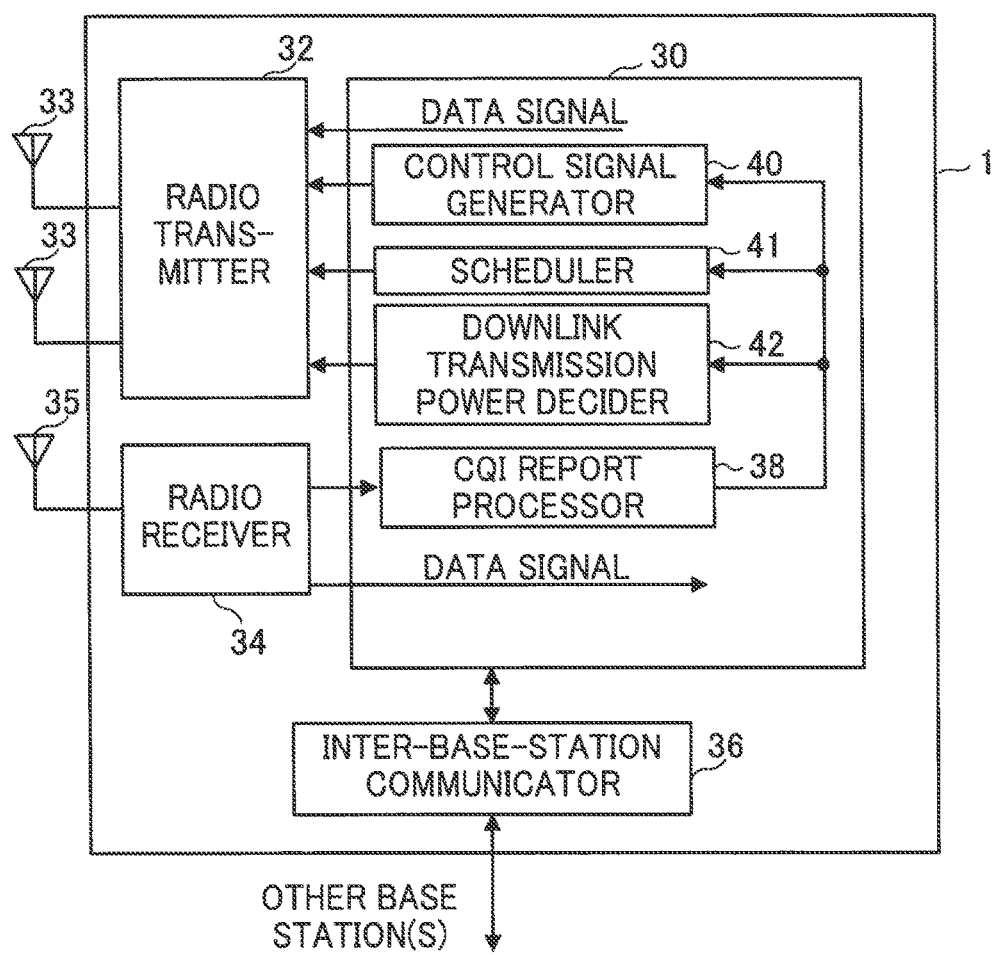
FIG. 6 is a block diagram illustrating a configuration of a base station according to a first embodiment of the present invention.

FIG. 6 is a block diagram illustrating a configuration of a base station according to the first embodiment of the present invention. A base station 1 includes a controller 30, a radio transmitter 32, transmission antennas 33, a radio receiver 34, a reception antenna 35, and an inter-base-station communicator 36.

The radio transmitter 32 is transmission circuitry for converting electrical signals into radio waves to be transmitted from the transmission antennas 33 for the purpose of the base station 1 performing radio transmission to each UE. The transmission antennas 33 form an adaptive antenna array. The radio receiver 34 is reception circuitry for converting radio waves received from the reception antenna 35 into electrical signals for the purpose of the base station 1 performing radio reception from each UE. The inter-base-station communicator 36 is a communication interface used for the base station 1 to communicate with another base station.

The controller 30 includes a CQI report processor 38, a control signal generator 40, a scheduler 41, and a downlink transmission power decider 42. The controller 30 is a CPU (central processing unit) that operates in accordance with a computer program. The CQI report processor 38, the control signal generator 40, the scheduler 41, and the downlink transmission power decider 42 are functional blocks realized by the controller 30 functioning in accordance with the computer program.

The controller 30 processes an uplink data signal that is transmitted from each UE connected to the base station 1 and received by the radio receiver 34. The CQI report processor 38 recognizes an SINR at each UE connected to the base station 1 based on a CQI (channel quality indicator) that is reported from the UE and received by the radio receiver 34.

The control signal generator 40 generates a control signal (PDCCH signal) addressed to each UE based on the SINR at the UE and other parameters. The scheduler 41 decides, based on at least one of the SINRs at the UEs or the other parameters, frequency and time resources for transmitting downlink data signals that are each addressed to a corresponding one of the UEs connected to the base station 1. The scheduler 41 also decides UEs that are to be subject to NOMA.

The downlink transmission power decider 42 decides a downlink transmission power for transmitting downlink data to each UE that is subject to NOMA and is connected to the base station 1 based on the SINR at the UE. That is, according to received qualities at the UEs, the downlink transmission power decider 42 allocates to each of these UEs one downlink transmission power among the different downlink transmission powers to be used for transmitting downlink data. The method for deciding downlink transmission powers may be any publicly known method relating to NOMA or any method appropriate for NOMA. The downlink transmission power decider 42 allocates a high downlink transmission power to a UE having low received quality.

The controller 30 supplies to the radio transmitter 32 downlink data signals and PDCCH signals, each of the downlink data signals and each of the PDCCH signals being addressed to a corresponding one of the UEs connected to the base station 1. The radio transmitter 32 transmits the downlink data signals and the PDCCH signals by way of the transmission antennas 33. The radio transmitter 32 transmits a mixed data signal in which the data signals that are not orthogonal to each other are mixed, each of the data signals being addressed to a corresponding one of the UEs subject to NOMA, such that each data signal is transmitted with the downlink transmission power decided by the downlink transmission power decider 42. In other words, data signals are transmitted with different downlink transmission powers to multiple UEs for which the same frequency is used simultaneously for downlink transmission. Moreover, the radio transmitter 32 transmits PDCCH signals to the UEs to enable each UE to decode a data signal addressed to the UE using a PDCCH signal corresponding to the UE.

The radio transmitter 32 transmits each PDCCH signal in a format in which the PDCCH signal is scrambled by the RNTI of the UE corresponding to the PDCCH signal. Moreover, the radio transmitter 32 includes, in a PDCCH signal addressed to a UE that is to cancel interference associated with NOMA, the RNTI of another UE to which a data signal that is to be canceled is addressed. In other words, the radio transmitter 32 includes, in a PDCCH signal for a first UE to which a first data signal is addressed, the RNTI of a second UT to which a second data signal is addressed, the first data signal having a downlink transmission power that is not the highest among the downlink transmission powers decided by the downlink transmission power decider 42, the second data signal being mixed in the mixed data signal together with the first data signal. The first UE is thereby enabled to descramble a PDCCH signal for the second UE. The number of hits in an RNTI is 16 here, but the bit length of an RNTI may vary depending on the system. It is noted that the radio transmitter 32 does not transmit to the first UE information indicating a radio resource for transmitting a PDCCI signal for the second UE.

In this embodiment, the radio transmitter 32 notifies a UE, for which a low power among powers multiplexed by NOMA is allocated, of the RNTI of another UE that belongs to the same group as the UE and for which UE a higher power than that for the UE is allocated.

Specifically, when downlink transmission power is allocated as illustrated in FIG. 3, the radio transmitter 32 does not include, in PDCCH signals addressed to the UEs 102 and 105, the RNTIs of other UEs. The radio transmitter 32 includes in a PDCCH signal addressed to the UE 101 the RNTI of the UE 102, and includes in a PDCCH signal addressed to the UE 100 the RNTI of the UE 101. The radio transmitter 32 includes in a PDCCH signal addressed to the UE 104 the RNTI of the UE 105, and includes in the PDCCH signal addressed to the UE 103 the RNTI of the UE 104. The UE 101 is able to decrypt a PDCCH signal for the UE 102 using the RNTI of the UE 102 and to demodulate a data signal addressed to the UE 102 using information elements included in that PDCCH signal. The UE 104 is able to decrypt a PDCCH signal for the UE 105 using the RNTI of the UE 105 and to demodulate a data signal addressed to the UE 105 using information elements included in that PDCCH signal. The UE 100 is able to decrypt a PDCCH signal for the UE 101 using the RNTI of the UE 101, further decrypt a PDCCH signal for the UE 102 using the RNTI of the UE 102 included in the PDCCH signal for the UE 101, and demodulate a data signal addressed to the UE 102 using information elements included in the PDCCH signal for the UE 102 (after that, the UE 100 is able to demodulate a data signal addressed to the UE 101 using the PDCCH signal for the UE 101). The UE 103 is able to decrypt a PDCCH signal for the UE 104 using the RNTI of the UE 104, further decrypt a PDCCH signal for the UE 105 using the RNTI of the UE 105 included in the PDCCH signal for the UE 104, and demodulate a data signal addressed to the UE 105 using information elements included in the PDCCH signal for the UE 105 (after that, the UE 103 is able to demodulate a data signal addressed to the UE 104 using the PDCCH signal for the UE 104).

When downlink transmission power is allocated as illustrated in FIG. 4, the radio transmitter 32 does not include, in a PDCCH signal addressed to the UE 103, the RNTIs of other UEs. The radio transmitter 32 includes in a PDCCH signal addressed to the UE 101 the RNTI of the UE 103, and includes in a PDCCH signal addressed to the UE 102 the RNTI of the UE 103. The radio transmitter 32 includes in a PDCCH signal addressed to the UE 100 the RNTI of the UE 101 and the RNTI of the UE 102. The UEs 101 and 102 are each able to decrypt a PDCCH signal for the UE 103 using the RNTI of the UE 103 and to demodulate a data signal addressed to the UE 103 using information elements included in that PDCCH signal. The UE 100 is able to decrypt a PDCCH signal for the UE 101 using the RNTI of the UE 101, decrypt a PDCCH signal for the UE 102 using the RNTI of the UE 102, further decrypt a PDCCH signal for the UE 103 using the RNTI of the UE 103 included in these PDCCH signals for the UE 101 and for the UE 102, and demodulate a data signal addressed to the UE 103 using information elements included in the PDCCH signal for the UE 103 (after that, the UE 100 is able to demodulate a data signal addressed to the UE 101 using the PDCCH signal for the UE 101 and demodulate a data signal addressed to the UE 102 using the PDCCH signal for the UE 102).

Figure 7:
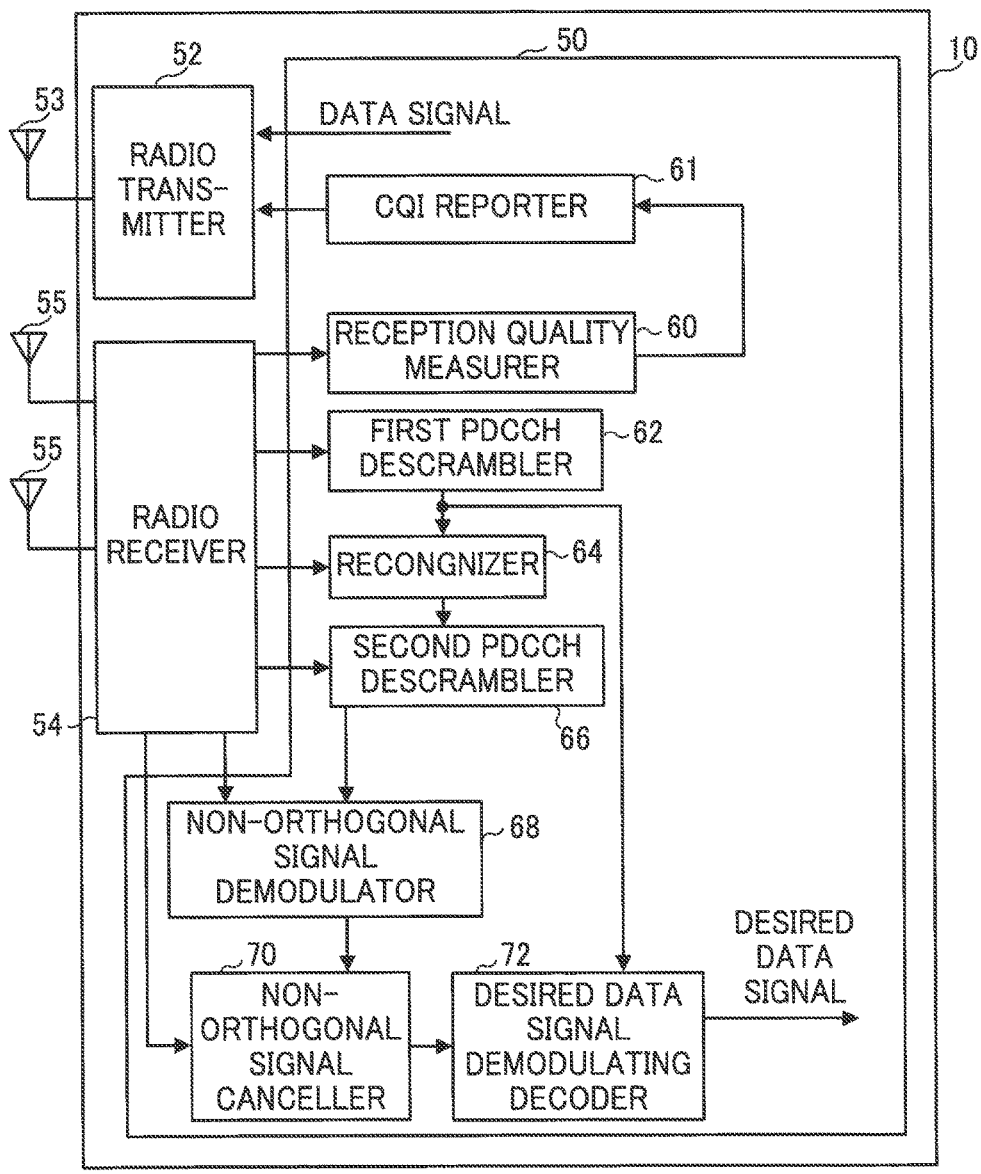
FIG. 7 is a block diagram illustrating a configuration of a user device according to the first embodiment.

FIG. 7 is a block diagram illustrating a configuration of a UE 10 according to the first embodiment. The abovementioned UEs (UE 100, etc.) each have the same configuration as that of the UE 10. The UE 10 includes a controller 50, a radio transmitter 52, a transmission antenna 53, a radio receiver 54, and reception antennas 55.

The radio transmitter 52 is transmission circuitry for converting electrical signals into radio waves to be transmitted from the transmission antenna 53 for the purpose of the UE 10 performing radio transmission to a serving base station. The radio receiver 54 is reception circuitry for converting radio waves received from the reception antennas 55 into electrical signals for the purpose of the UE 10 performing radio reception from the serving base station. The reception antennas 55 form an adaptive antenna array.

The controller 50 is a CPU that operates in accordance with a computer program. The controller 50 includes a reception quality measurer 60, a CQI reporter 61, a first PDCCH descrambler (first descrambler) 62, a recognizer 64, a second PDCCH descrambler (second descrambler) 66, a non-orthogonal signal demodulator 68, a non-orthogonal signal canceller 70, and a desired data signal demodulating decoder (desired data signal decoder) 72. These internal elements of the controller 50 are functional blocks realized by the controller 50 functioning in accordance with the computer program.

The controller 50 supplies an uplink data signal to the radio transmitter 52 and the radio transmitter 52 transmits the uplink data signal to the serving base station by way of the transmission antenna 53. The reception quality measurer 60 measures an SINR of a radio signal received by the radio receiver 54. The CQI reporter 61 generates a CQI based on the SINR and supplies the CQI to the radio transmitter 52. The radio transmitter 52 transmits the CQI to the serving base station with a control channel.

The radio receiver 54 receives, from the serving base station, a mixed data signal that includes data signals that have different powers, are not orthogonal to each other, and are each addressed to a corresponding one of the UEs, and PDCCH signals corresponding to the UEs.

The first PDCCH descrambler 62 descrambles a PDCCH signal corresponding to the UE 10 using the RNTI of the UE 10. The recognizer 64 recognizes, from information included in the PDCCH signal that has been descrambled by the first PDCCH descrambler 62 and corresponds to the UE 10, an RNTI of at least one other UE to which at least one non-orthogonal data signal is addressed, the at least one non-orthogonal data signal being mixed in the mixed data signal together with a desired data signal addressed to the UE 10.

The second PDCCH descrambler 66 descrambles a PDCCH signal corresponding to the at least one other UE using the RNTI of the at least one other UE recognized by the recognizer 64. The non-orthogonal signal demodulator 68 demodulates the at least one non-orthogonal data signal using control information elements included in the PDCCH signal that has been descrambled by the second PDCCH descrambler 66 and corresponds to the at least one other UE. The non-orthogonal signal canceller 70 cancels from the mixed data signal a replica signal that is equivalent to the at least one non-orthogonal data signal demodulated by the non-northogonal signal demodulator 68. In other words, the second PDCCH descrambler 66, the non-orthogonal signal demodulator 68, and the non-orthogonal signal canceller 70 together form an interference canceller of the subject UE. The interference canceller may be an SLIC, a CWIC, or an ML. When the interference canceller is a CWIC, the non-orthogonal signal demodulator 68 performs decoding of a non-orthogonal data signal as well as demodulation.

The desired data signal demodulating decoder 72 decodes the desired data signal from a signal output from the non-orthogonal signal canceller 70 using the PDCCH signal that has been descrambled by the first PDCCH descrambler 62 and corresponds to the subject UE.

Figure 8:
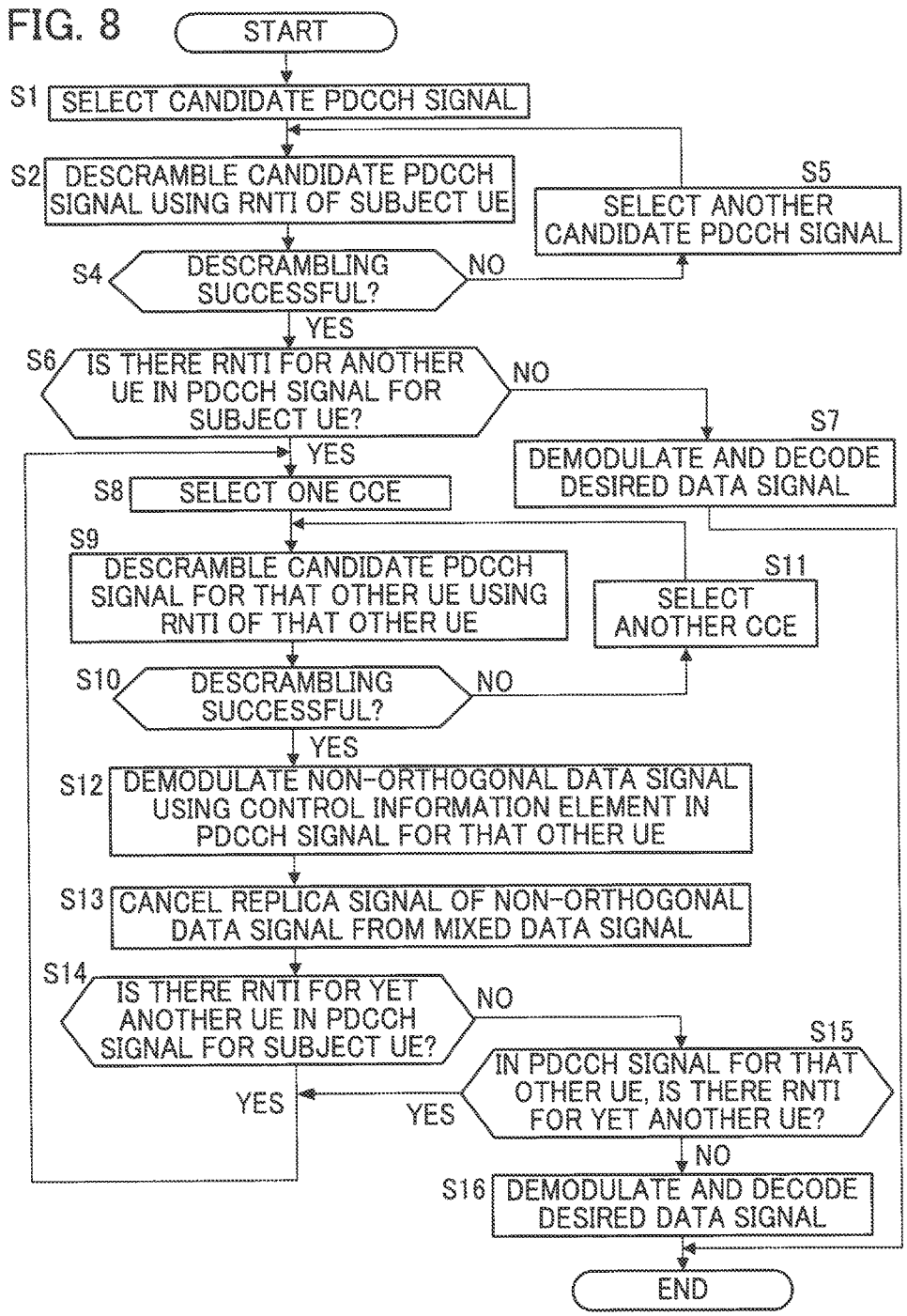
FIG. 8 is a flowchart illustrating processing executed by the user device illustrated in FIG. 7.

FIG. 8 is a flowchart illustrating processing executed by the UE 10. In step S1, the first PDCCH descrambler 62 selects one candidate from PDCCH signals (PDCCH signals including a PDCCH signal for the UE 10) transmitted from the base station, and in step S2, the first PDCCH descrambler 62 attempts descrambling the PDCCH signal corresponding to the UE 10 using the RNTI of the UE 10. A PDCCH signal includes a CRC bit scrambled by an RNTI, and when the RNTI obtained by descrambling a selected candidate PDCCH signal matches the RNTI of the subject UE, that candidate PDCCH signal is a PDCCH signal for the subject UE. When it is determined in step S4 that the first PDCCH descrambler 62 has not succeeded in descrambling the PDCCH signal for the subject UE (w(hen the RNTI obtained by the first PDCCH descrambler 62 descrambling the candidate PDCCH signal does not match the RNTI of the subject UE), the first PDCCH descrambler 62 selects another candidate from the PDCCH signals (step S5) and descrambles this candidate PDCCH signal (step S2).

When it is determined in step S4 that the first PDCCH descrambler 62 has succeeded in descrambling the PDCCH signal for the subject UE (when the RNTI obtained by the first PDCCH descrambler 62 descrambling the candidate PDCCH signal matches the RNTI of the subject UE), the recognizer 64 determines in step S6 whether information included in the descrambled PDCCH signal corresponding to the subject UE 10 includes an RNTI of another UE.

When the PDCCH for the UE 10 does not include an RNTI of another the second PDCCH descrambler 66, the non-orthogonal signal demodulator 68, and the non-orthogonal signal canceller 70 do not operate, and the desired data signal demodulating decoder 72 demodulates and decodes the mixed data signal as the desired data signal for the UE 10 (step S7). That is, a UE (e.g., in the example of FIG. 3, the UE 102 or the UE 105), to which the highest transmission power is allocated in each group in NOMA, demodulates and decodes a received data signal as a desired data signal for the UE without operating the interference canceller.

When the PDCCH for the UE 10 includes an RNTI of another UE, the second PDCCH descrambler 66 selects one CCE in step S8, and attempts descrambling a candidate PDCCH signal in the selected CCE using the RNTI of that other UE in step S9. When the RNTI obtained by the second PDCCH descrambler 66 descrambling the candidate PDCCH signal matches the RNTI of that other UE, this PDCCH signal is a PDCCH signal for that other UE. When it is determined in step S10 that the second PDCCH descrambler 66 has not succeeded in descrambling the PDCCH signal for that other UE (when the RNTI obtained by the second PDCCH descrambler 66 descrambling the candidate PDCCH signal does not match the RNTI of that other UE recognized in step S6), the second PDCCH descrambler 66 selects another CCE (step S11) and descrambles another candidate PDCCH signal (step S9). Details of CCE will be described later in the third embodiment.

When it is determined in step S10 that the second PDCCH descrambler 66 has succeeded in descrambling the PDCCH signal for that other UE (when the RNTI obtained by the second PDCCH descrambler 66 descrambling the candidate PDCCH signal matches the RNTI of that other UE recognized in step S6), the candidate PDCCH signal obtained by descrambling is a PDCCH signal that corresponds to another UE that belongs to the same group as the subject UE 10 and to which a higher power than that for the UE 10 is allocated. This candidate PDCCH signal includes control information elements (see FIG. 5) required to demodulate a data signal (non-orthogonal data signal) addressed to that other UE. Accordingly, in step S12, the non-orthogonal signal demodulator 68 demodulates the non-orthogonal data signal using these control information elements. In step S13, the non-orthogonal signal canceller 70 cancels from the mixed data signal a replica signal that is equivalent to the non-orthogonal data signal.

When the PDCCH signal for the UE 10 includes an RNTI of yet another UE, the determination result in step S14 will be positive, and the processing returns to step S8. When the PDCCH signal of that other UE, the PDCCH signal being determined in step S10 to have been successfully descrambled, includes an RNTI of yet another UE, the determination result in step S15 will be positive, and the processing returns to step S8.

When there is no more RNTI of another UE to be checked (when the determination results in step S14 and in step S15 are both negative), it means that interference data signals addressed to other UEs that belong to the same group as the UE 10 and have higher powers than that for the UE 10 are not superimposed on the desired data signal addressed to the UE 10. In this case, the desired data signal demodulating decoder 72 decodes the desired data signal from a signal output from the non-orthogonal signal canceller 70 using the PDCCH signal that has been descrambled by the first PDCCH descrambler 62 and corresponds to the UE 10 (step S16).

For example, the UE 101 in FIG. 3 first cancels a data signal addressed to the UE 102, and when the determination results in step S14 and in step S15 are negative, demodulates a data signal addressed to the UE 101. The UE 100 in FIG. 3 first cancels a data signal addressed to the 102, and since the determination result in step S15 is positive, proceeds to cancel a data signal addressed to the UE 101 to demodulate a data signal addressed to the UE 100.

For example, the UE 100 in FIG. 4 first cancels a data signal addressed to the UE 101, and since the determination result in step S14 is positive, proceeds to cancel a data signal addressed to the UE 102, and then after the determination result in step S14 becomes negative, demodulates a data signal addressed to the UE 100.

According to the base station according to this embodiment, a PDCCH signal for a first UE to which a first data signal is addressed includes an RNTI (16 bits) of at least one second UE to which at least one second data signal is addressed, the first data signal having a downlink transmission power that is not the highest, the at least one second data signal being mixed in a mixed data signal together with the first data signal. Accordingly, the first UE is able to descramble a PDCCH signal for the at least one second UE using the RNTI of this second UE, demodulate the at least one second data signal, and cancel a replica signal that is equivalent to the at least one second data signal from the mixed data signal. Since information indicating a radio resource for transmitting the PDCCH signal for the at least one second UE is not transmitted to the first UE, it is possible to reduce an increase in the amount of information that is transmitted with a PDCCH signal for an interference canceller. In this way, it is possible to reduce an increase in traffic amount.

The UE according to this embodiment recognizes an RNTI of at least one other UE from information included in a PDCCH signal corresponding to the subject UE 10 and attempts descrambling one PDCCH signal among PDCCH signals using the RNTI of the at least one other UE. When the descrambling is successful, the UE demodulates a non-orthogonal data signal and cancels a replica signal equivalent to the non-orthogonal data signal from a mixed data signal. In this way, without knowing a radio resource used for transmitting a PDCCH signal for the at least one other UE, the UE is able to decrypt the PDCCH signal for this at least one other UE by blind decoding, demodulate the non-orthogonal data signal, and cancel a replica signal equivalent to the non-orthogonal data signal from the mixed data signal. Accordingly, this UE contributes to reduce an increase in the amount of information that is transmitted with a PDCCH signal for the interference canceller.

In NOMA, there can be multiple groups of data signals having different transmission powers (there can be multiple groups of UEs). The radio transmitter 32 of the base station according to this embodiment includes, in a PDCCH signal for a first UE to which a first data signal is addressed, the RNTI of a second UE to which a second data signal is addressed, the first data signal having a downlink transmission power that has been decided by the downlink transmission power decider 42 and is not the highest, the second data signal being mixed together with the first data signal in the mixed data signal. The first UE is thereby enabled to descramble a PDCCH signal for the second UE. In other words, the radio transmitter 32 notifies a UE to which a low power among powers multiplexed by NOMA is allocated, of the RNTI of another UE that belongs to the same group as the UE and to which a higher power than that for the UE is allocated. The UE is not notified of the RNTIs of UEs belonging to another group.

Furthermore, the UE according to this embodiment recognizes, from a PDCCH signal corresponding to the subject UE 10, an RNTI of at least one other UE to which a non-orthogonal data signal is addressed, the non-orthogonal data signal being mixed in the mixed data signal together with a desired data signal addressed to the UE 10. That is, the UE 10 recognizes an RNTI of another UE that belongs to the same group as the UE 10. Accordingly, when the UE 10 attempts descrambling one PDCCH signal among PDCCH signals using the RNTI of that other UE and when the descrambling is successful (when the determination result in step S10 is positive), the descrambled PDCCH signal is a PDCCH signal for that other UE belonging to the same group as the UE 10 and the descrambled PDCCH signal corresponds to the non-orthogonal data signal. As a result, when the descrambling is successful, the UE 10 is able to demodulate the non-orthogonal data signal (step S12), and therefore, the processing load on the UE 10 is reduced.

Figure 9:
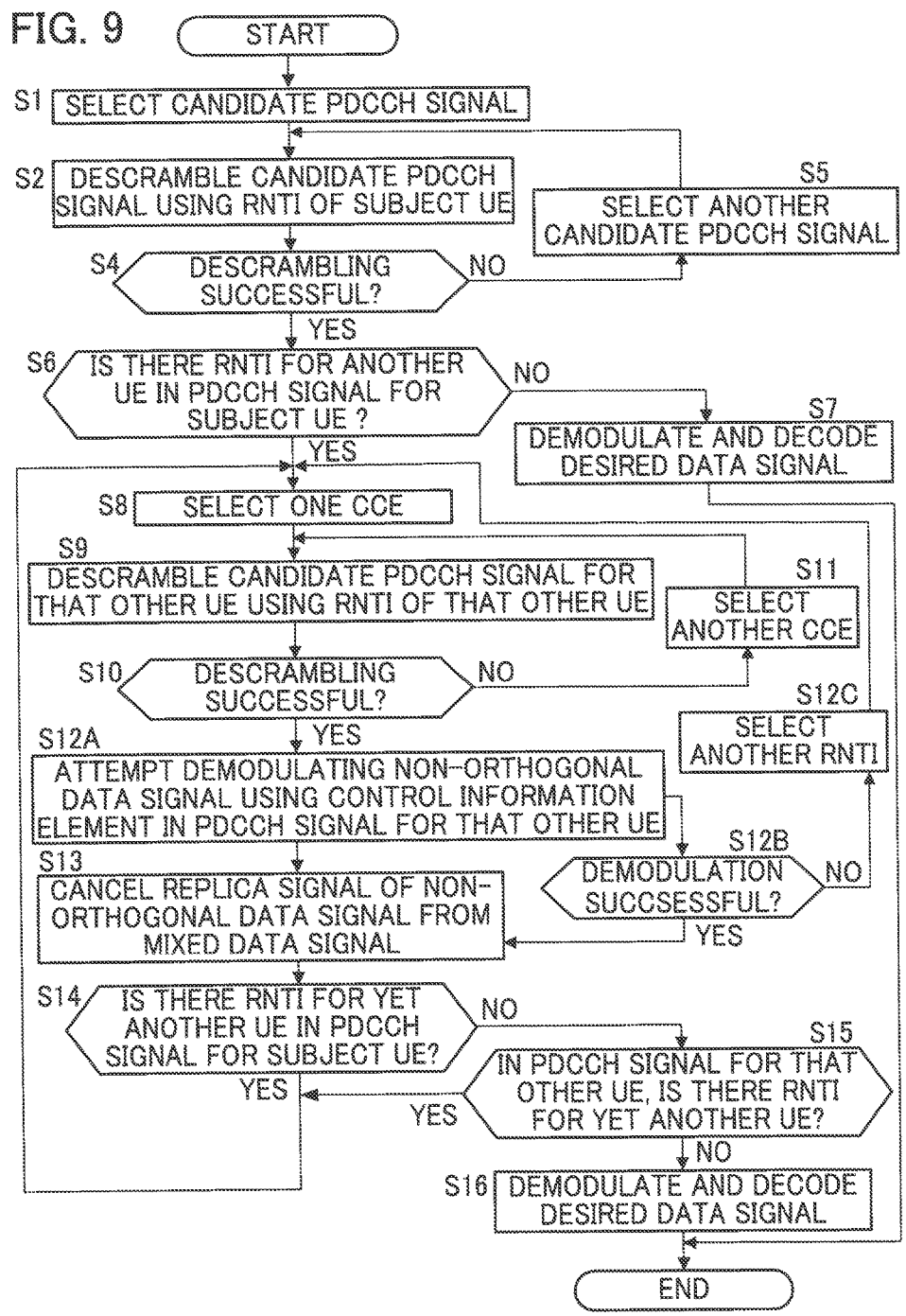
FIG. 9 is a flowchart illustrating processing executed by a user device of a comparative example.

FIG. 9 is a flowchart illustrating processing executed by a UE 10 according to a comparative example. In this comparative example, a UE that is subject to NOMA and to which a low power is allocated is notified of, in addition to the RNTIs of other UEs belonging to the same group as the UE, the RNTIs of other UEs belonging to all the other groups in NOMA. In this case, even when the UE attempts descrambling one PDCCH signal among PDCCH signals using the RNTI of another UE and succeeds in descrambling that PDCCH signal (even when the determination result in step S10 is positive), the descrambled PDCCH signal may not be a PDCCH signal for another UE that belongs to the same group as the UE 10.

In view of the above circumstances, in the processing in the comparative example, the non-orthogonal signal demodulator 68 in step S12A attempts demodulating a non-orthogonal data signal using control information elements in a PDCCH signal for another UE and determines in step S12B whether the demodulation was successful. When the non-orthogonal signal demodulator 68 has succeeded in demodulating the non-orthogonal data signal, the non-orthogonal signal canceller 70 cancels in step S13 a replica signal that is equivalent to the non-orthogonal data signal from the mixed data signal. However, when the non-orthogonal signal demodulator 68 has failed in demodulating the non-orthogonal data signal, the processing proceeds to step S12C and another RNTI is selected, because the PDCCH signal used for the demodulation is a PDCCH signal for a UE belonging to another group and does not correspond to an interference data signal that is superimposed on a desired data signal addressed to the UE 10. As described above, the processing in the comparative example is complex whereas the processing in the embodiment is simpler than that in the comparative example.

Second Embodiment

Next, a second embodiment of the present invention will be described. In the first embodiment, the RNTI of an interfering UE multiplexed by NOMA is notified to a UE using a PDCCH signal. The length of an RNTI is 16 bits and the cycle of a PDCCH signal is one subframe (1 millisecond). However, the amount of information that can be transmitted with a PDCCH signal is limited, and thus, the amount of such information should be kept small. Moreover, transmitting an RNTI at the cycle of one subframe is undesirable for communication efficiency.

In view of the above circumstances, in the second embodiment of the present invention, a base station, at a cycle longer than a transmission cycle of a PDCCH signal, notifies UEs that are subject to NOMA of a list in which multiple RNTIs of multiple UEs, to which data signals that are not orthogonal to each other are addressed, are associated in a one-to-one correspondence with indices that each have a shorter length than an RNTI does. The base station includes, in a PDCCH signal for a UE subject to NOMA, an index corresponding to another UE that belongs to the same group as the UE and to which a higher power than that for the UE is allocated.

FIG. 10 illustrates an example of a list used in the second embodiment. Each RNTI is associated with an index in a one-to-one correspondence. The RNTI has a length of 16 bits, whereas the index has a length shorter than 16 bits. This list may include the RNTIs of UEs of every group, to which UEs NOMA is applied in the base station. This list may be notified by higher-layer signaling (RRC (radio resource control) signaling) semi-statically to UEs of every group, each of the UEs being allocated with a transmission power that is not the highest among the powers in the group to which the UE belongs. The notification cycle may be 100 milliseconds or 1 second, for example.

The radio transmitter 32 (see FIG. 6) of the base station includes, in a PDCCH signal that is transmitted at a cycle of 1 millisecond for a first UE (a UE that is subject to NOMA and is allocated with a downlink transmission power that is not the highest in the group to which the UE belongs), an index corresponding to at least one second UE (a UE that belongs to the same group as the first UE and is allocated with a higher transmission power than that for the first UE). By a UE receiving a list such as that illustrated in FIG. 10 in advance, when the UE is notified of index 00, for example, with a PDCCH signal, the UE will be able to recognize from the index and from the list that the RNTI of a second UE is 0123.

Since an index has a shorter length than an RNTI does, it is possible to further reduce an increase in the amount of information transmitted with a PDCCH signal for an interference canceller. The list may be compressed using an existing data compression technique. With compression, it is possible to reduce an increase in the amount of information transmitted by higher-layer signaling.

Other features may be the same as those described in the first embodiment. The radio receiver 54 (see FIG. 7) of a UE 10, at a longer cycle (e.g., 100 milliseconds or 1 second) than the transmission cycle (1 millisecond) of a PDCCH signal, receives from the base station information that indicates a list in which multiple RNTIs of multiple UEs, to which data signals that are not orthogonal to each other are addressed, are associated in a one-to-one correspondence with indices that each have a shorter length than an RNTI does. Moreover, the radio receiver 54 of a UE 10, which is subject to NOMA and is allocated with a downlink transmission power that is not the highest, receives a PDCCH signal for the UE 10 that includes an index corresponding to at least one other UE.

In the processing (see FIG. 8) executed by a UE 10, when it is determined in step S4 that the first PDCCH descrambler 62 has succeeded in descrambling the PDCCH signal for the subject UE 10 (when the RNTI obtained by descrambling the PDCCH signal matches the RNTI of the subject UE), the recognizer 64 determines in step S6 whether the index of another UE is included in information included in the descrambled PDCCH signal corresponding to the UE 10. When the index of another UE is included in the PDCCH signal for the UE 10, the recognizer 64 of the UE 10 recognizes the RNTI of that other UE from the index included in the PDCCH signal for the UE 10 and from the list received in advance.

Moreover, in step S15, if it is determined in step S10 that the descrambling of the PDCCH signal for that other UE was successful, the recognizer 64 determines whether this PDCCH signal includes the RNTI of yet another UE. Here, the recognizer 64 determines whether information included in that descrambled PDCCH signal corresponding to that other UE includes the index of yet another UE. When the PDCCH signal for that other UE does include the index of yet another UE, the recognizer 64 of the UE 10 recognizes the RNTI of the yet another UE from the index included in the PDCCH signal for that other UE and from the list received in advance.

As described above, according to this embodiment, at a cycle longer than the transmission cycle of a PDCCH signal, UEs are notified of a list in which the RNTIs of UEs, to which data signals that are not orthogonal to each other are addressed, are associated in a one-to-one correspondence with indices of these UEs. A PDCCH signal for a first UE includes an index corresponding to at least one second UE. The first UE is able to identify the RNTI of the at least one second UE from the list and from the index corresponding to the at least one second UE, descramble a PDCCH signal for the at least one second UE using the RNTI of the at least one second UE (step S9) to demodulate a second data signal (step S12), and cancel a replica signal that is equivalent to the second data signal from the mixed data signal (step S13).

This embodiment achieves similar advantages as those achieved in the first embodiment Furthermore, since an index included in a PDCCH signal for the first UE has a shorter length than an RNTI does, it is possible to reduce an increase in the amount of information that is transmitted with the PDCCH signal for an interference canceleer. In this way, it is possible to further reduce an increase in traffic amount.

In the first embodiment, in order to reduce an increase in the amount of information in a PDCCH signal, the radio transmitter 32 of the base station does not include, in a PDCCH signal for a first UE, information indicating a radio resource for transmitting a PDCCH signal for a second UE. In this embodiment, as in the first embodiment, the radio transmitter 32 does not need to include in a PDCCH signal for a first UE information that indicates a radio resource for transmitting a PDCCH signal for a second UE. As a modification of the second embodiment, unlike in the first embodiment, the radio transmitter 32 may include, in a PDCCH signal for a first UE, information (specifically, a CCE index to be described later) indicating a radio resource for transmitting a PDCCH signal for a second UE.

Third Embodiment

Next, a third embodiment of the present invention will be described. The third embodiment can be applied to any of the first embodiment, the second embodiment, and modifications thereof.

In LTE a concept called aggregation level is used in the transmission of PDCCH signals. FIG. 11 illustrates aggregation levels. A PDCCH is allocated to an REG (resource element group) other than a PCFICH (physical control format indicator channel) and a PHICH (physical hybrid-ARQ indicator channel). In the allocation of a PDCCH, a concept called CCE (control channel element) is used. One CCE is a set of nine successive REGs and one REQ is a set of four resource elements.

The number of CCEs to which DCI transmitted with a PDCCH is allocated differs depending on the aggregation level. The aggregation level is any one of 1, 2, 4, and 8. Description will be given using eight CCEs hereinafter. With aggregation level 1, eight PDCCH signals corresponding to eight UEs are transmitted using eight CCEs. That is, one PDCCH signal corresponding to one UE is transmitted using the CCE of index 0, one PDCCH signal corresponding to one UE is transmitted using the CCE of index 1, and one PDCCH signal corresponding to one UE is transmitted using the CCE of index 2. Thus, one PDCCH signal corresponding to one UE is transmitted using each CCE.

With aggregation level 2, four PDCCH signals corresponding to four UEs are transmitted using eight CCEs. That is, one PDCCH signal corresponding to one UE is transmitted using the CCEs of indices 0 and 1, one PDCCH signal corresponding to one UE is transmitted using the CCEs of indices 2 and 3, and one PDCCH signal corresponding to one UE is transmitted using the CCEs of indices 4 and 5. Thus, one PDCCH signal corresponding to one UE is transmitted using each pair of CCEs.

With aggregation level 4, two PDCCH signals corresponding to two UEs are transmitted using eight CCEs. In other words, one PDCCH signal corresponding to one UE is transmitted using the CCEs of indices 0 to 3, one PDCCH signal corresponding to one UE is transmitted using the CCEs of indices 4 to 7, and one PDCCH signal corresponding to one UE is transmitted using the CCEs of indices 8 to 11. Thus, one PDCCH signal corresponding to one UE is transmitted using each set constituted by four CCEs.

With aggregation level 8, one PDCCH signal corresponding to one UE is transmitted using eight CCEs. That is, one PDCCH signal corresponding to one UE is transmitted using the CCEs of indices 0 to 7, one PDCCH signal corresponding to one UE is transmitted using the CCEs of indices 8 to 15, and one PDCCH signal corresponding to one UE is transmitted using the CCEs of indices 16 to 23. Thus, one PDCCH signal corresponding to one UE is transmitted using each set constituted by eight CCEs.

Thus, the lower the aggregation level is, the fewer the CCEs allocated to one UE (one PDCCH signal) there are, and the higher the aggregation level is, the smaller the number of UEs (number of PDCCH signals) for which eight CCEs are used is. The purpose of this is to increase the probability of successful reception of the PDCCH signals by giving a high aggregation level to a UE with low downlink received quality. The aggregation level is set by the base station based on a CQI, ACK/NACK, or the like, which is fed back from the UE. A low aggregation level is set for a UE with good downlink received quality, and a high aggregation level is set for a UE with poor downlink received quality.

The base station does not notify a UE of the aggregation level and CCEs to which a PDCCH for the UE, is allocated. However, if the UE attempts decrypting a PDCCH signal with every one of or some of the aggregation levels, and if the UE successfully decrypts the PDCCH signal for the UE (if the UE is able to identify the PDCCH signal for the UE from among many PDCCH signals), the UE will know the CCEs thereof, and therefore will also know the aggregation level.

In order to simplify the identification of the PDCCH signal by the UE, restrictions are placed on CCE allocation. Specifically, if a UE with aggregation level 1 is allocated to the CCE of index 0, only another UE with aggregation level 1 can be allocated to the CCE of index 1. However, another UE with aggregation level 1 or 2 can be allocated to the CCE of index 2, and another UE with aggregation level 1, 2, or 4 can be allocated to the CCE of index 4 (another UE with aggregation level 8 cannot be allocated to the CCEs of indices 1 to 7). If a UE with aggregation level 2 is allocated to the CCE of index 0, only that UE can be allocated to the CCE of index 1 thereafter, while another UE with aggregation level 1 or 2 can be allocated to the CCE of index 2, and another UE with aggregation level 1, 2, or 4 can be allocated to the CCE of index 4 (another UE with aggregation level 8 cannot be allocated to the CCEs of indices 1 to 7). If a UE with aggregation level 4 is allocated to the CCE of index 0, only that UE can be allocated to the CCEs of indices 1 to 3, while another UE with aggregation level 1, 2, or 4 can be allocated to the CCE of index 4 (another UE with aggregation level 8 cannot be allocated to the CCEs of indices 1 to 7). If a UE with aggregation level 8 is allocated to the CCE of index 0, only that UE can be allocated to the CCEs of indices 1 to 7 thereafter. In other words, if the aggregation level is n, the CCE index that is a multiple of n is the starting number of the CCEs for the PDCCH signal for a UE with that aggregation level.

As described above, a low aggregation level is set for a UE with good downlink received quality. In NOMA, a low data transmission power is allocated to a UE with good downlink received quality, and a low aggregation level is set therefor. On the other hand, a high data transmission power is allocated to a UE with poor downlink received quality, and a high aggregation level is set therefor. Accordingly, it is envisioned that for a UE whose data signal is overlapped with those of other UEs in NOMA, there is little need to attempt decrypting PDCCHs with an aggregation level lower than that of the UE in order to decrypt the PDCCHs addressed to the other UEs. Accordingly, based on the aggregation level of the UE, it is possible to limit the search space in which the PDCCH signals for the other UEs are searched for.

If the aggregation level allocated to a UE is 4, that UE needs to cancel a data signal addressed to a UE whose aggregation level is 8, but does not need to cancel data signals addressed to UEs whose aggregation levels are 1, 2, and 4. Accordingly, if the aggregation level allocated to a UE is 4, the UE will need to decrypt PDCCH signals with aggregation level 8 (each set composed of eight CCEs whose indices start at multiples of 8 and 0), but the UE will not need to decrypt PDCCH signals with aggregation levels 1, 2, and 4. In other words, sets each composed of one CCE, sets each composed of two CCEs, and sets each composed of four CCEs can be excluded from the targets whose PDCCH signals are to be decrypted.

If the aggregation level allocated to a UE is 2, the UE needs to cancel data signals addressed to UEs whose aggregation levels are 4 and 8, but does not need to cancel data signals addressed to UEs whose aggregation levels are 1 and 2. Accordingly, if the aggregation level allocated to a UE is 2, that UE will need to decrypt PDCCH signals with aggregation levels 4 and 8 (sets of CCEs whose indices start at multiples of 4 and 0), but the UE will not need to decrypt PDCCH signals with aggregation levels 1 and 2. In other words, sets each composed of one CCE and sets each composed of two CCEs can be excluded from the targets whose PDCCH signals are to be decrypted.

If the aggregation level allocated to a UE is 1, the UE will need to decrypt PDCCH signals with an aggregation level of 2 or more (sets of CCEs whose indices start at multiples of 2 and 0), but the UE will not need to decrypt PDCCH signals with aggregation level 1. In other words, sets each composed of one CCE can be excluded from the targets whose PDCCH signals are to be decrypted.

Figure 12:
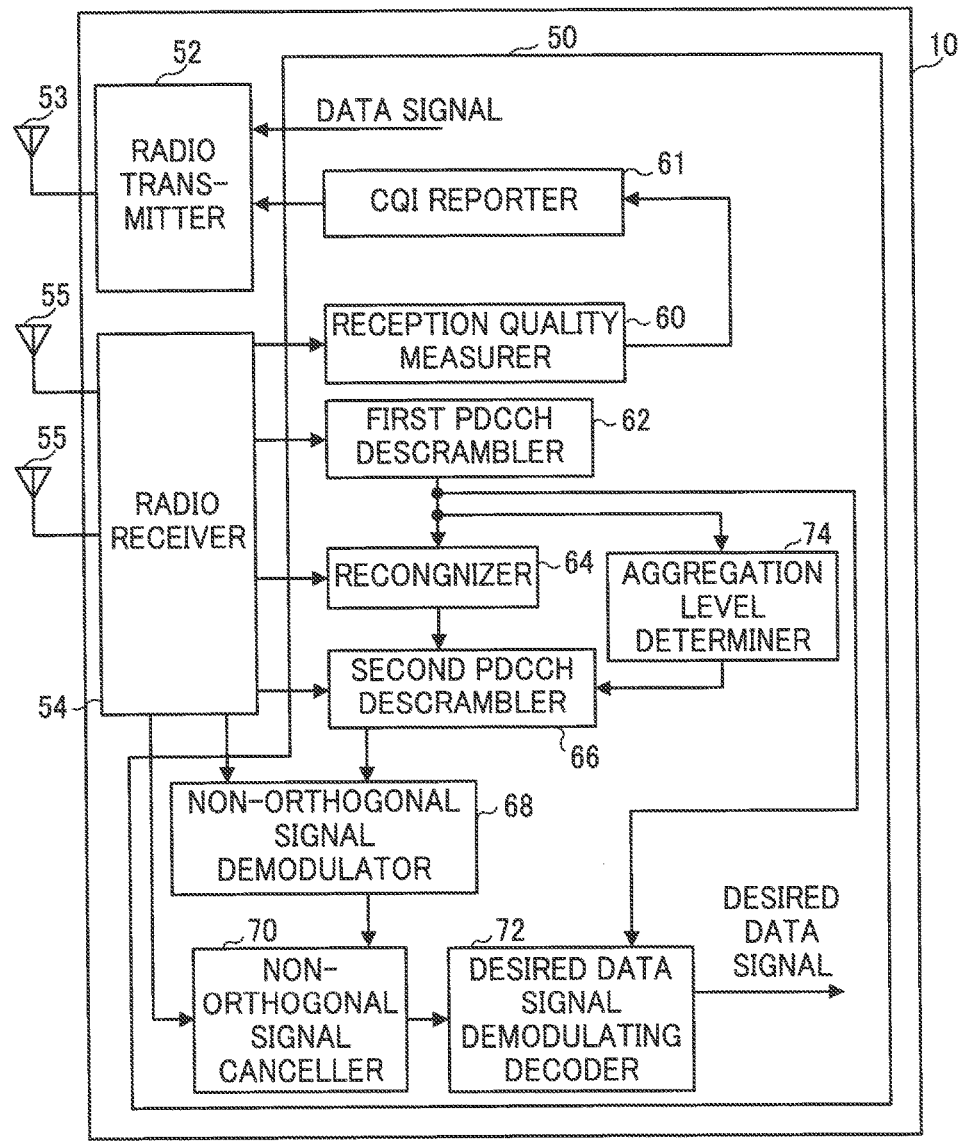
FIG. 12 is a block diagram illustrating a configuration of a user device according to a third embodiment of the present invention.

FIG. 12 is a block diagram illustrating a configuration of a UE 10 according to the third embodiment. The controller 50 of this UE 10 includes an aggregation level determiner 74 in addition to the internal elements described in the first embodiment. The aggregation level determiner 74 is a functional block realized by the controller 50 functioning in accordance with the computer program. The aggregation level determiner 74 distinguishes CCEs of the PDCCH signal corresponding to the subject UE and based on these CCEs determines an aggregation level corresponding to the PDCCH signal. The second PDCCH descrambler 66 attempts descrambling PDCCH signals that correspond to aggregation levels higher than the aggregation level corresponding to the UE using the RNTIs of the other UEs.

Processing executed by a UE 10 according to the third embodiment will be described with reference to the flowchart shown in FIG. 13. This processing is similar to the processing shown in FIG. 8, the same reference signs are used to indicate steps that are the same as those in the processing shown in FIG. 8, and such steps will not be described in detail.

Figure 13:
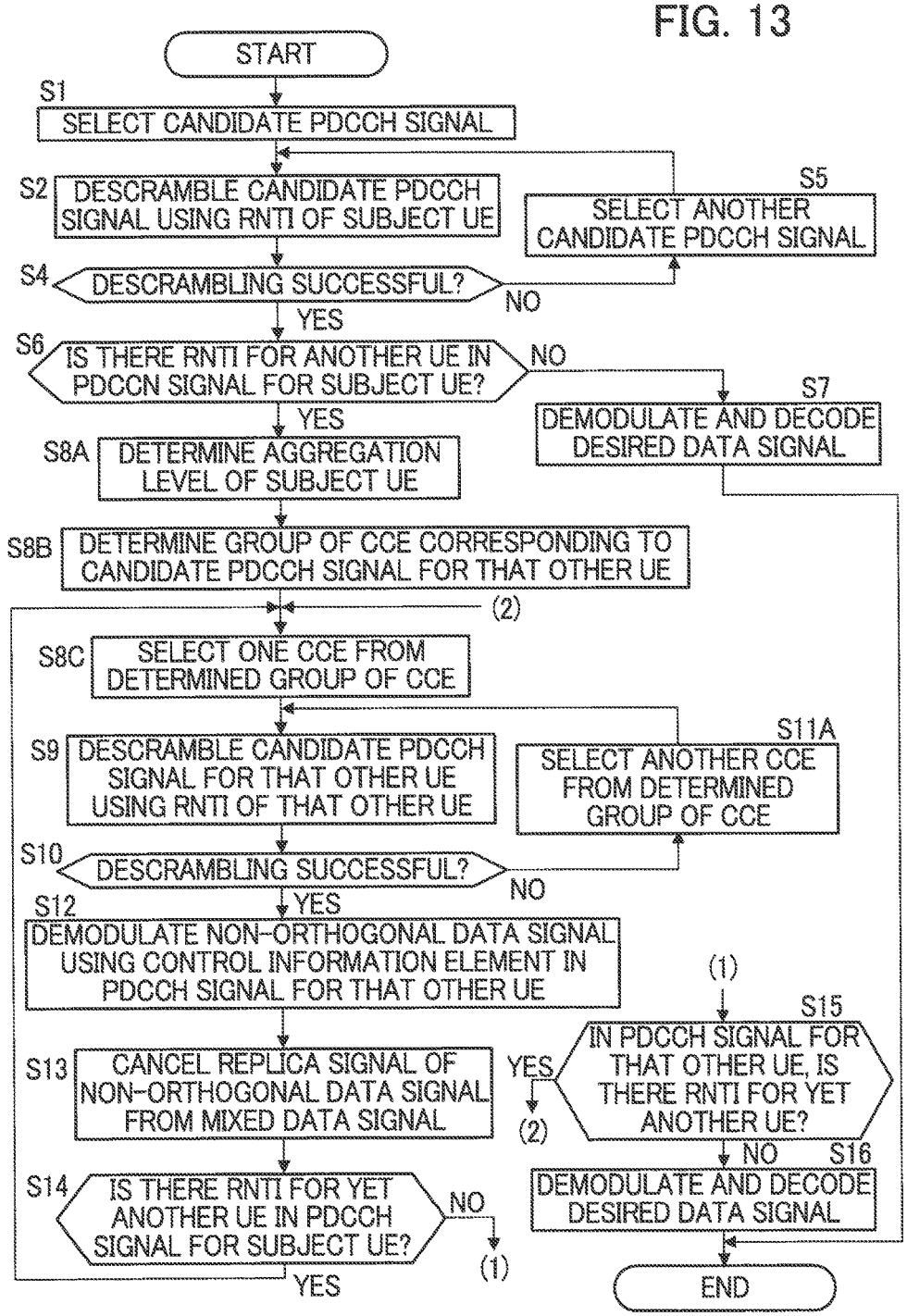
FIG. 13 is a flowchart illustrating processing executed by the user device illustrated in FIG. 13.

In the processing illustrated in FIG. 13, when the determination result in step S6 is positive (when the PDCCH of the UE 10 includes the RNTI of another UE), in step S8A, the aggregation level determiner 74 distinguishes CCEs of the PDCCH signal corresponding to the subject UE, and based on these CCEs, determines an aggregation level corresponding to the PDCCH signal.

In step S8B, based on the aggregation level corresponding to the UE, the aggregation level determiner 74 determines a group of CCEs that each correspond to a candidate PDCCH signal for that other UE. As described above, for example, when the aggregation level assigned to the UE is 2, the UE does not need to decrypt PDCCH signals with aggregation level 1 or 2. Thus, sets each composed of one CCE and sets each composed of two CCEs can be excluded from the targets whose PDCCH signals are to be decrypted. In this case, PDCCH signals with aggregation levels 4 and 8 will be decrypted, and thus the aggregation level determiner 74 determines sets of CCEs whose indices start at multiples of 4 and 0 as the group of CCEs (CCE group) that each correspond to the candidate PDCCH signal for that other UE.

In step S8C, the second PDCCH descrambler 66 selects one CCE among the CCE group determined in step S8B, and in step S9, attempts descrambling a candidate PDCCH signal in that CCE using the RNTI of that other UE. In this way, the second PDCCH descrambler 66 attempts descrambling candidate PDCCH signals that correspond to aggregation levels higher than the aggregation level corresponding to the UE.

When it is determined in step S10 that the second PDCCH descrambler 66 has not succeeded in descrambling the PDCCH signal of that other UE (when the RNTI obtained by descrambling the candidate PDCCH signal does not match the RNTI of that other UE recognized in step S6), the second PDCCH descrambler 66 selects another CCE among the CCE group determined in step S8B (step S11A) and descrambles that other candidate PDCCH signal (step S9).

In this embodiment, based on the aggregation level of the UE, the search space in which a PDCCH signal for another UE is searched for can be limited, and therefore it is possible to reduce the processing load on the UE and to quickly find the PDCCH signal for that other UE.

The second PDCCH descrambler 66 may attempt descrambling PDCCH signals corresponding to aggregation levels equal to or higher than the aggregation level corresponding to the UE using the RNTI of another UE. For example, when the aggregation level assigned to the UE is 2, PDCCH signals with aggregation level 2 as well as those with the aggregation levels 4 and 8 may be decrypted, and in step S8B, the aggregation level determiner 74 may determine sets of CCEs whose indices start at multiples of 2 and 0 as a group of CCEs that each correspond to the candidate PDCCH signal for that other UE. Accordingly, the second PDCCH descrambler 66 attempts descrambling candidate PDCCH signals corresponding to aggregation levels that are equal to or higher than aggregation level 2 corresponding to the UE, i.e., aggregations levels 2, 4, and 8.

Alternatively, when the aggregation level of the UE determined in step S8A is 1 or 2, the aggregation level determiner 74 may in step S8B determine sets of CCEs whose indices start at multiples of 4 and 0 as a group of CCEs that each correspond to the candidate PDCCH signal for that other UE. In this case, CCEs with aggregation levels 4 and 8 are each selected in step S8C, and in step S9, the second PDCCH descrambler 66 attempts descrambling the candidate PDCCH signal for that other UE in that CCE using the RNTI of that other UE.

When the determination result in step S15 is positive (when it is determined that the PDCCH signal for that other UE has been successfully descrambled in step S10 and when that PDCCH signal includes the RNTI of yet another UE), the processing returns to step S8C. Accordingly, in step S8C, the second PDCCH descrambler 66 selects one CCE among the CCE group determined in step S8B. However, if the UE has succeeded in decrypting the PDCCH signal for that other UE in step S10, the corresponding CCE will be known, and thus the aggregation level of that other UE will also be known. Therefore, when the determination result in step S15 is positive, the aggregation level of that other UE may be determined, and by determining CCEs based on the determined aggregation level, the search space in which the PDCCH signal for the yet another UE is searched for may be further limited.

Fourth Embodiment

Next, a fourth embodiment of the present invention will be described. The fourth embodiment can be applied to any of the first embodiment, the second embodiment, and modifications thereof.

As described above in the third embodiment, a low aggregation level is set for a UE with good downlink received quality, and a high aggregation level is set for a UE with poor downlink received quality. In NOMA, a low transmission power is allocated to a UE with good downlink received quality, and that UE cancels data signals addressed to UEs that have poor received quality and have high transmission powers allocated thereto. Accordingly, a UE for which a high aggregation level is set is a UE that has poor downlink received quality and has a high transmission power allocated thereto, and such a UE is able to decode a desired data signal (high power) addressed to the UE without canceling interference data signals (low power) addressed to other UEs, even if these data signals addressed to other UEs are overlapped on the desired data signal by NOMA.

In view of this, a UE according to the fourth embodiment determines, based on a PDCCH signal corresponding to the UE, an aggregation level corresponding to that PDCCH signal, and if the aggregation level corresponding to the UE is higher than a certain value (e.g., 2 or 4), the UE decodes a desired data signal without cancelling data signals addressed to other UEs. Accordingly, if the aggregation level corresponding to that UE is higher than a certain value (e.g., 2 or 4), the UE neither decrypts PDCCH signals for the other UEs nor demodulates data signals addressed to the other UEs.

The block diagram of a UE according to the fourth embodiment may be the same as that illustrated in FIG. 12. However, when the aggregation level corresponding to the PDCCH signal determined by the aggregation level determiner 74 is higher than a certain value, the second PDCCH descrambler 66, the non-orthogonal signal demodulator 68, and the non-orthogonal signal canceller 70 do not operate, and the desired data signal demodulating decoder 72 decodes the mixed data signal as the desired data signal.

Processing executed by a UE 10 according to the fourth embodiment will be described with reference to the flowchart of FIG. 14. The processing is similar to the processing shown in FIG. 8, the same reference signs are used to indicate steps that are the same as those in the processing shown in FIG. 8, and such steps will not be described in detail.

In the processing illustrated in FIG. 14, when the determination result in step S6 is positive (when the PDCCH for the UE 10 includes the RNTI of another UE), in step S8A, the aggregation level determiner 74 distinguishes CCEs of the PDCCH signal corresponding to the UE, and based on these CCEs, determines the aggregation level corresponding to the PDCCH signal.

In step S8D, the aggregation level determiner 74 determines whether the aggregation level corresponding to the PDCCH signal is lower than a certain threshold (e.g., 4). When the determination result in step S8D is negative (that is, when the aggregation level corresponding to the PDCCH signal is 4 or 8), the second PDCCH descrambler 66, the non-orthogonal signal demodulator 68, and the non-orthogonal signal canceller 70 do not operate, and the desired data signal demodulating decoder 72 demodulates and decodes the mixed data signal as the desired data signal for the subject UE 10 (step S7). That is, since a high transmission power is allocated to the UE 10 in NOMA, the UE 10 demodulates and decodes the received data signal as the desired data signal for the subject UE without operating the interference canceller.

When the determination result in step S8D is positive (that is, when the aggregation level corresponding to the PDCCH signal is 1 or 2), the second PDCCH descrambler 66 selects one CCE in step S8, and attempts descrambling the candidate PDCCH signal in that CCE using the RNTI of that other UE in step S9.

In this embodiment, in a case in which the aggregation level of the UE is higher than a certain value, it is possible to omit the process for demodulating or cancelling a data signal for another UE, and therefore to reduce the processing load on the UE.

The above-described embodiments and modifications may be combined with each other so long as they do not conflict with each other. For example, the third and fourth embodiments may be combined, and the determination in step S8D in FIG. 14 may be inserted between step S8A and step S8B in FIG. 13.

In the UE, the functions executed by the CPU may be executed by hardware instead of by the CPU, or may be executed by a programmable logic device such as an FPGA (Field Programmable Gate Array) or a DSP (Digital Signal Processor).

DESCRIPTION OF REFERENCE SIGNS

1 . . . base station; 10, 100-105 . . . UE; 30 . . . controller; 32 . . . radio transmitter; 33 . . . transmission antenna; 34 . . . radio receiver; 35 . . . reception antenna; 36 . . . inter-base-station communicator; 38 . . . CQI report processor; 40 . . . control signal generator; 41 . . . scheduler; 42 . . . downlink transmission power decider; 50 . . . controller; 52 . . . radio transmitter; 53 . . . transmission antenna; 54 . . . radio receiver; 55 . . . reception antenna; 60 . . . reception quality measurer; 61 . . . CQI reporter; 62 . . . first PDCCH descrambler (first descrambler); 64 . . . recognizer; 66 . . . second PDCCH descrambler (second descrambler); 68 . . . non-orthogonal signal demodulator; 70 . . . non-orthogonal signal canceller; 72 . . . desired data signal demodulating decoder (desired data signal decoder); 74 . . . aggregation level determiner.

The invention claimed is:

1. A base station comprising:
a downlink transmission power decider configured to allocate, according to received qualities at user devices, to each of the user devices, one of different downlink transmission powers for downlink data transmission; and
a radio transmitter configured to transmit a mixed data signal in which data signals that are not orthogonal to each other are mixed, each of the data signals being addressed to a corresponding one of the user devices, such that each data signal is transmitted with a corresponding one of the downlink transmission powers decided by the downlink transmission power decider, and to transmit control signals to the user devices to enable each user device to decode the data signal addressed to the user device using a control signal, among the control signals, corresponding to the user device,
wherein the radio transmitter transmits each control signal in a format in which the control signal is scrambled by an identifier of the user device corresponding to the control signal,
wherein in order to enable a first user device, to which a first data signal is addressed, to descramble a control signal for at least one second user device, to which at least one second data signal is addressed, the radio transmitter includes, in a control signal for the first user device, information indicating an identifier of the at least one second user device, the first user device and the at least one second user device being among the user devices, the first data signal having a downlink transmission power that is not the highest among the downlink transmission powers decided by the downlink transmission power decider, the second data signal being mixed in the mixed data signal together with the first data signal, and
wherein the radio transmitter does not transmit to the first user device information indicating a radio resource for transmitting the control signal for the at least one second user device.

2. The base station according to claim 1,
wherein the radio transmitter, at a cycle longer than a transmission cycle of the control signals, notifies the user devices of a list in which identifiers of the user devices, to which the data signals that are not orthogonal to each other are addressed, are associated in a one-to-one correspondence with indices that each have a shorter length than the identifiers each do, and
wherein the radio transmitter includes, in the control signal for the first user device, an index corresponding to the at least one second user device.

3. A base station comprising:
a downlink transmission power decider configured to decide, according to received qualities at user devices, different downlink transmission powers for transmitting downlink data to the user devices; and
a radio transmitter configured to transmit a mixed data signal in which data signals that are not orthogonal to each other are mixed, each of the data signals being addressed to a corresponding one of the user devices, such that each data signal is transmitted with a corresponding one of the downlink transmission powers decided by the downlink transmission power decider, and to transmit control signals to the user devices to enable each user device to decode the data signal addressed to the user device using a control signal, among the control signals, corresponding to the user device,
wherein the radio transmitter transmits each control signal in a format in which the control signal is scrambled by an identifier of the user device corresponding to the control signal,
wherein the radio transmitter, at a cycle longer than a transmission cycle of the control signals, notifies the user devices of a list in which identifiers of the user devices, to which the data signals that are not orthogonal to each other are addressed, are associated in a one-to-one correspondence with indices that each have a shorter length than the identifiers each do, and
wherein in order to enable a first user device, to which a first data signal is addressed, to descramble a control signal for at least one second user device, to which at least one second data signal is addressed, the radio transmitter includes, in a control signal for the first user device, an index that corresponds to the at least one second user device, the first user device and the at least one second user device being among the user devices, the first data signal having a downlink transmission power that is not the highest among the downlink transmission powers decided by the downlink transmission power decider, the second data signal being mixed in the mixed data signal together with the first data signal.

4. A user device comprising:
a radio receiver configured to receive, from a base station, a mixed data signal that includes data signals that are not orthogonal to each other, have different powers, and are each addressed to a corresponding one of user devices, and to receive control signals corresponding to the user devices;
a first descrambler configured to descramble a control signal that is among the control signals and corresponds to the user device using an identifier of the user device;
a recognizer configured to recognize, from information included in the control signal that corresponds to the user device and is descrambled by the first descrambler, an identifier of at least one other user device, to which at least one non-orthogonal signal is addressed, the at least one non-orthogonal signal being mixed in the mixed data signal together with a desired data signal addressed to the user device;
a second descrambler configured to descramble a control signal that is among the control signals and corresponds to the at least one other user device using the identifier of the at least one other user device recognized by the recognizer;
a non-orthogonal signal demodulator configured to demodulate the at least one non-orthogonal data signal using the control signal corresponding to the at least one other user device and descrambled by the second descrambler;
a non-orthogonal signal canceller configured to cancel, from the mixed data signal, a replica signal that is equivalent to the at least one non-orthogonal data signal demodulated by the non-orthogonal signal demodulator; and
a desired data signal decoder configured to decode the desired data signal from a signal output from the non-orthogonal signal canceller using the control signal corresponding to the user device descrambled by the first descrambler,
wherein the second descrambler attempts descrambling one control signal among the control signals corresponding to the user devices that include the at least one other user device using the identifier of the at least one other user device,
wherein in a case in which the second descrambler fails in descrambling the one control signal, the second descrambler attempts descrambling another control signal among the control signals, and
wherein in a case in which the second descrambler succeeds in descrambling the one control signal, the non-orthogonal signal demodulator demodulates the at least one non-orthogonal data signal using a control signal output from the second descrambler, and the non-orthogonal signal canceller cancels from the mixed data signal the replica signal that is equivalent to the at least one non-orthogonal data signal.

5. The user device according to claim 4,
wherein the radio receiver receives, from the base station and at a cycle longer than a transmission cycle of the control signals, information indicating a list in which identifiers of the user devices, to which the data signals that are not orthogonal to each other are addressed, are associated in a one-to-one correspondence with indices that each have a shorter length than the identifiers each do,
wherein the radio receiver receives the control signal for the user device, the control signal including an index that corresponds to the at least one other user device, and
wherein the recognizer recognizes, from the list and from the index corresponding to the at least one other user device, the identifier of the at least one other user device.

6. The user device according to claim 5, further comprising an aggregation level determiner configured to determine, based on the control signal corresponding to the user device, an aggregation level corresponding to that control signal,
wherein the second descrambler attempts descrambling control signals that are among the control signals and correspond to aggregation levels equal to or higher than the aggregation level corresponding to the user device.

7. The user device according to claim 5, further comprising an aggregation level determiner configured to determine, based on the control signal corresponding to the user device, an aggregation level corresponding to that control signal,
wherein in a case in which the aggregation level corresponding to the user device is higher than a certain value, the second descrambler, the non-orthogonal signal demodulator, and the non-orthogonal signal canceller do not operate, and the desired data signal decoder decodes the mixed data signal as the desired data signal.

8. The user device according to claim 4, further comprising an aggregation level determiner configured to determine, based on the control signal corresponding to the user device, an aggregation level corresponding to that control signal,
    wherein the second descrambler attempts descrambling control signals that are among the control signals and correspond to aggregation levels equal to or higher than the aggregation level corresponding to the user device.

9. The user device according to claim 8,
    wherein in a case in which the aggregation level corresponding to the user device is higher than a certain value, the second descrambler, the non-orthogonal signal demodulator, and the non-orthogonal signal canceller do not operate, and the desired data signal decoder decodes the mixed data signal as the desired data signal.

10. The user device according to claim 4, further comprising an aggregation level determiner configured to determine, based on the control signal corresponding to the user device, an aggregation level corresponding to that control signal,
    wherein in a case in which the aggregation level corresponding to the user device is higher than a certain value, the second descrambler, the non-orthogonal signal demodulator, and the non-orthogonal signal canceller do not operate, and the desired data signal decoder decodes the mixed data signal as the desired data signal.

* * * * *